(12) United States Patent
Hur et al.

(10) Patent No.: US 11,902,348 B2
(45) Date of Patent: Feb. 13, 2024

(54) POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

(71) Applicant: LG Electronics Inc., Seoul (KR)

(72) Inventors: Hyejung Hur, Seoul (KR); Sejin Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 231 days.

(21) Appl. No.: 17/354,606

(22) Filed: Jun. 22, 2021

(65) Prior Publication Data
US 2021/0400103 A1 Dec. 23, 2021

Related U.S. Application Data

(60) Provisional application No. 63/042,504, filed on Jun. 22, 2020.

(51) Int. Cl.
| | | |
|---|---|---|
| *G06F 15/16* | (2006.01) | |
| *H04L 65/70* | (2022.01) | |
| *G06T 9/40* | (2006.01) | |
| *G06T 9/00* | (2006.01) | |
| *H04L 67/10* | (2022.01) | |
| *H04L 65/75* | (2022.01) | |

(52) U.S. Cl.
CPC .............. *H04L 65/70* (2022.05); *G06T 9/001* (2013.01); *G06T 9/40* (2013.01); *H04L 65/75* (2022.05); *H04L 67/10* (2013.01)

(58) Field of Classification Search
CPC ........... G06T 9/001; G06T 9/40; H04L 65/70; H04L 65/75; H04L 9/40; H04L 65/752; H04L 65/756; H04L 67/01; H04L 67/10
See application file for complete search history.

(56) References Cited

U.S. PATENT DOCUMENTS

| | | | |
|---|---|---|---|
| 2019/0394484 A1 | 12/2019 | Rose et al. | |
| 2021/0097722 A1* | 4/2021 | Mammou | ................. G06T 9/00 |
| 2021/0248784 A1* | 8/2021 | Gao | ........................... G06T 9/40 |
| 2022/0353492 A1* | 11/2022 | Yano | ...................... H04N 19/96 |

FOREIGN PATENT DOCUMENTS

| | | |
|---|---|---|
| KR | 20190075051 | 6/2019 |
| WO | WO2020008106 | 1/2020 |

OTHER PUBLICATIONS

Khaled Mammou, Coding of Moving Pictures and Audio, ISO/IEC JTC1/SC29/WG11, Jan. 2019, International Organisation for Standardisation). (Year: 2019).*

(Continued)

*Primary Examiner* — Wing F Chan
*Assistant Examiner* — Andrew Woo
(74) *Attorney, Agent, or Firm* — Fish & Richardson P.C.

(57) ABSTRACT

Disclosed herein is a method for transmitting point cloud data, including encoding the point cloud data and transmitting a bitstream including the point cloud data. Disclosed herein is a method for receiving point cloud data, including receiving a bitstream including point cloud data and decoding the point cloud data.

16 Claims, 24 Drawing Sheets

(56) References Cited

OTHER PUBLICATIONS

Gao et al., "[G-PCC][New proposal] Predictive Geometry Coding," International Organisation for Standardization, ISO/IEC JTC1/SC29/WG11, Coding of Moving Pictures and Audio, Presented at Geneva, CH, Oct. 2019, 10 pages.
International Search Report in International Appln. No. PCT/KR2021/007598, dated Sep. 28, 2021, 20 pages (with English translation).
Mammou et al., "G-PCC codec description v2," International Organisation for Standardization, ISO/IEC JTC1/SC29/WG11 N18189, Coding of Moving Pictures and Audio, Presented at Marrakech, MA, Jan. 2019, 39 pages.

* cited by examiner

FIG. 6
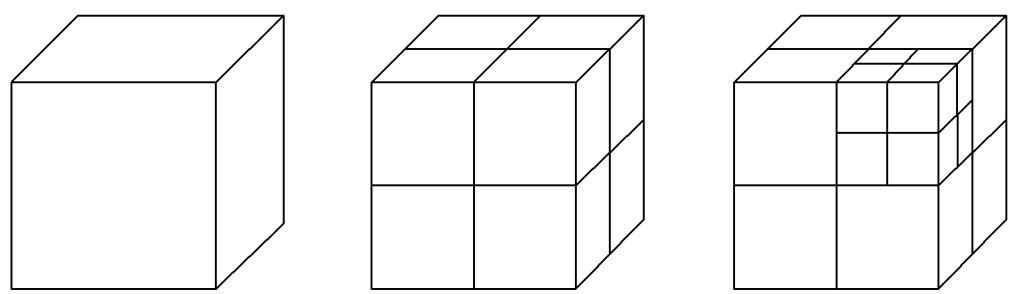
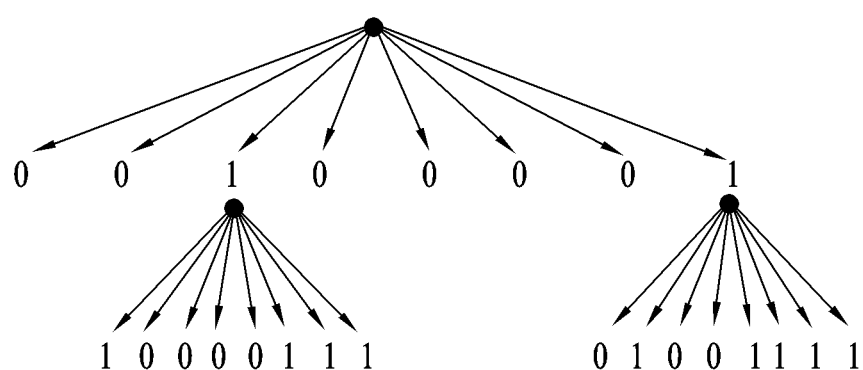

FIG. 7
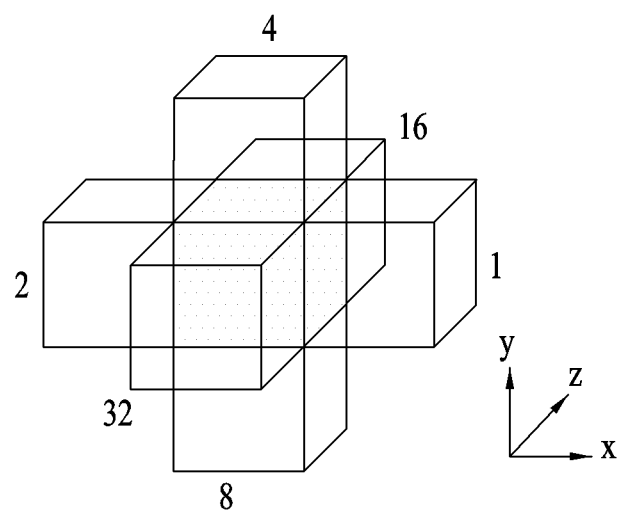
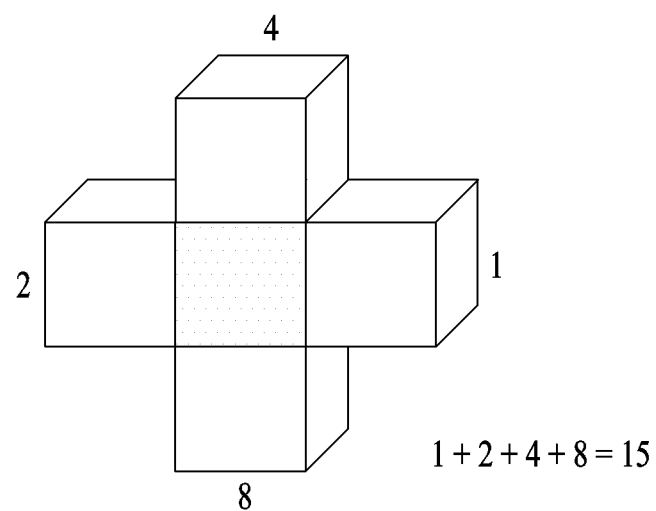
$1 + 2 + 4 + 8 = 15$

FIG. 19

| seq_parameter_set_rbsp( ) { | Descriptor |
|---|---|
|   profile_idc | u(8) |
|   profile_compatibility_flags | u(24) |
|   ... | |
|   sps_num_attribute_sets | ue(v) |
|   for( i = 0; i< sps_num_attribute_sets; i++ ) { | |
|     attribute_dimension[ i ] | ue(v) |
|     attribute_instance_id[ i ] | ue(v) |
|     ... | |
|   } | |
|   pred_geom_tree_sorting_num_steps | u(4) |
|   for (i=0; i< pred_geom_tree_sorting_num_steps; i++) { | |
|    pred_geom_tree_sorting_type[i] | u(4) |
|    if (pred_geom_type_sorting_type[i] > 0) { | |
|     pred_geom_tree_sorting_ascending_flag[i] | u(1) |
|    } | |
|    pred_geom_tree_group_sorting_flag[i] | u(1) |
|    if(pred_geom_tree_group_sorting_flag[i]) { | |
|     pred_geom_tree_grouping_n_digit[i] | u(4) |
|    } | |
|   } | |
|   pred_geom_tree_building_method | u(4) |
| | |
|   ... | |
|   byte_alignment( ) | |
| } | |

FIG. 20

| geometry_parameter_set_rbsp( ) { | Descriptor |
|---|---|
|   gps_geom_parameter_set_id | ue(v) |
|   gps_seq_parameter_set_id | ue(v) |
|   ... | |
|   pred_geom_tree_sorting_num_steps | u(4) |
|   for (i=0; i< pred_geom_tree_sorting_num_steps; i++) { | |
|     pred_geom_tree_sorting_type[i] | u(4) |
|     if (pred_geom_type_sorting_type[i] > 0) { | |
|       pred_geom_tree_sorting_ascending_flag[i] | u(1) |
|     } | |
|     pred_geom_tree_group_sorting_flag[i] | u(1) |
|     if(pred_geom_tree_group_sorting_flag[i]) { | |
|       pred_geom_tree_grouping_n_digit[i] | u(4) |
|     } | |
|   } | |
|   pred_geom_tree_building_method | u(4) |
| | |
|   ... | |
|   byte_alignment( ) | |
| } | |

FIG. 21

| tile_parameter_set( ) { | Descriptor |
|---|---|
|   num_tiles | ue(v) |
|   for( i = 0; i < num_tiles; i++ ) { | |
|     tile_bounding_box_offset_x[ i ] | se(v) |
|     tile_bounding_box_offset_y[ i ] | se(v) |
|     ... | |
|     pred_geom_tree_sorting_num_steps[i] | u(4) |
|     for (j=0; j< pred_geom_tree_sorting_num_steps; j++) { | |
|       pred_geom_tree_sorting_type[i][j] | u(4) |
|       if (pred_geom_type_sorting_type[i][j] > 0) { | |
|         pred_geom_tree_sorting_ascending_flag[i][j] | u(1) |
|       } | |
|       pred_geom_tree_group_sorting_flag[i][j] | u(1) |
|       if(pred_geom_tree_group_sorting_flag[i][j]) { | |
|         pred_geom_tree_grouping_n_digit[i][j] | u(4) |
|       } | |
|     } | |
|     pred_geom_tree_building_method[i] | u(4) |
| ... | |
|   } | |
|   byte_alignment( ) | |
| } | |

FIG. 22

| geometry_slice_header( ) { | Descriptor |
|---|---|
| gsh_geometry_parameter_set_id | ue(v) |
| gsh_tile_id | ue(v) |
| gsh_slice_id | ue(v) |
| ... | |
| pred_geom_tree_sorting_num_steps | u(4) |
| for (i=0; i< pred_geom_tree_sorting_num_steps; i++) { | |
| pred_geom_tree_sorting_type[i] | u(4) |
| if (pred_geom_type_sorting_type[i] > 0) { | |
| pred_geom_tree_sorting_ascending_flag[i] | u(1) |
| } | |
| pred_geom_tree_group_sorting_flag[i] | u(1) |
| if(pred_geom_tree_group_sorting_flag[i]) { | |
| pred_geom_tree_grouping_n_digit[i] | u(4) |
| } | |
| } | |
| pred_geom_tree_building_method | u(4) |
| ... | |
| } | |
| byte_alignment( ) | |
| } | |

POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

CROSS-REFERENCE TO RELATED APPLICATION

This application claims the benefit of U.S. Provisional Application No. 63/042,504, filed on Jun. 22, 2020, which is hereby incorporated by reference as if fully set forth herein.

TECHNICAL FIELD

Embodiments relate to a method and device for processing point cloud content.

BACKGROUND

Point cloud content is content represented by a point cloud, which is a set of points belonging to a coordinate system representing a three-dimensional space. The point cloud content may express media configured in three dimensions, and is used to provide various services such as virtual reality (VR), augmented reality (AR), mixed reality (MR), and self-driving services. However, tens of thousands to hundreds of thousands of point data are required to represent point cloud content. Therefore, there is a need for a method for efficiently processing a large amount of point data.

SUMMARY

Embodiments provide a device and method for efficiently processing point cloud data. Embodiments provide a point cloud data processing method and device for addressing latency and encoding/decoding complexity.

The technical scope of the embodiments is not limited to the aforementioned technical objects, and may be extended to other technical objects that may be inferred by those skilled in the art based on the entire contents disclosed herein.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the disclosure, as embodied and broadly described herein, a method for transmitting point cloud data may include encoding the point cloud data, and transmitting a bitstream containing the point cloud data. In another aspect of the present disclosure, a method for receiving point cloud data may include receiving a bitstream containing the point cloud data, and decoding the point cloud data.

Devices and methods according to embodiments may process point cloud data with high efficiency.

The devices and methods according to the embodiments may provide a high-quality point cloud service.

The devices and methods according to the embodiments may provide point cloud content for providing general-purpose services such as a VR service and a self-driving service.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. For a better understanding of various embodiments described below, reference should be made to the description of the following embodiments in connection with the accompanying drawings. The same reference numbers will be used throughout the drawings to refer to the same or like parts. In the drawings:

FIG. 6 shows an example of an octree and occupancy code according to embodiments;

FIG. 7 shows an example of a neighbor node pattern according to embodiments;

FIG. 19 shows a sequence parameter set according to embodiments;

FIG. 20 shows a geometry parameter set according to embodiments;

FIG. 21 shows a tile parameter set according to embodiments;

FIG. 22 shows a geometry slice header according to embodiments;

DETAILED DESCRIPTION

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that may be implemented according to the present disclosure. The following detailed description includes specific details in order to provide a thorough understanding of the present disclosure. However, it will be apparent to those skilled in the art that the present disclosure may be practiced without such specific details.

Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings.

Figure 1:
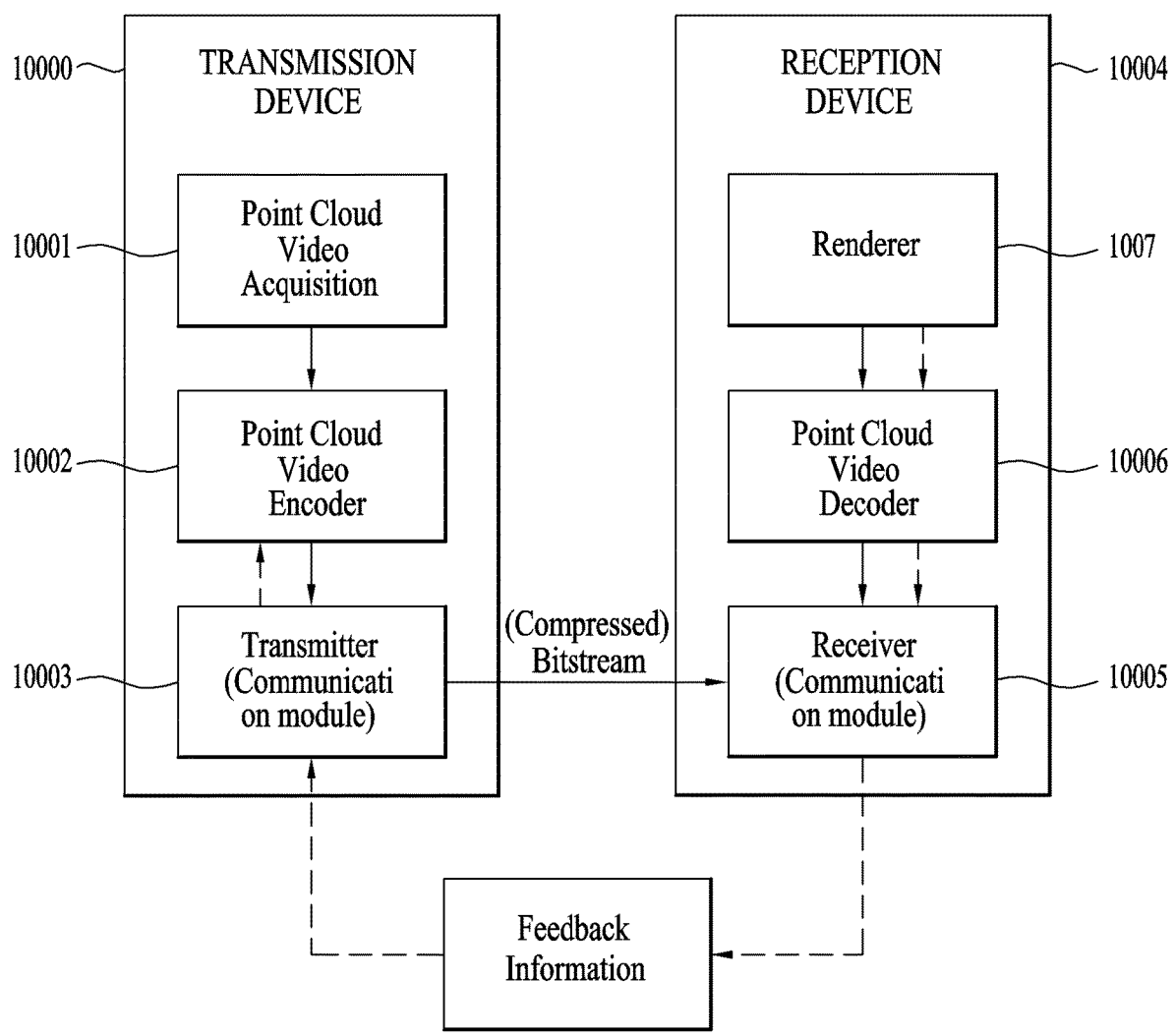
FIG. 1 shows an exemplary point cloud content providing system according to embodiments.

FIG. 1 shows an exemplary point cloud content providing system according to embodiments.

The point cloud content providing system illustrated in FIG. 1 may include a transmission device 10000 and a reception device 10004. The transmission device 10000 and the reception device 10004 are capable of wired or wireless communication to transmit and receive point cloud data.

The point cloud data transmission device 10000 according to the embodiments may secure and process point cloud video (or point cloud content) and transmit the same. According to embodiments, the transmission device 10000 may include a fixed station, a base transceiver system (BTS), a network, an artificial intelligence (AI) device and/or system, a robot, an AR/VR/XR device and/or server. According to embodiments, the transmission device 10000 may include a device, a robot, a vehicle, an AR/VR/XR device, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The transmission device 10000 according to the embodiments includes a point cloud video acquirer 10001, a point cloud video encoder 10002, and/or a transmitter (or communication module) 10003.

The point cloud video acquirer 10001 according to the embodiments acquires a point cloud video through a processing process such as capture, synthesis, or generation. The point cloud video is point cloud content represented by a point cloud, which is a set of points positioned in a 3D space, and may be referred to as point cloud video data. The point cloud video according to the embodiments may include one or more frames. One frame represents a still image/picture. Therefore, the point cloud video may include a point cloud image/frame/picture, and may be referred to as a point cloud image, frame, or picture.

The point cloud video encoder 10002 according to the embodiments encodes the acquired point cloud video data. The point cloud video encoder 10002 may encode the point cloud video data based on point cloud compression coding. The point cloud compression coding according to the embodiments may include geometry-based point cloud compression (G-PCC) coding and/or video-based point cloud compression (V-PCC) coding or next-generation coding. The point cloud compression coding according to the embodiments is not limited to the above-described embodiment. The point cloud video encoder 10002 may output a bitstream containing the encoded point cloud video data. The bitstream may contain not only the encoded point cloud video data, but also signaling information related to encoding of the point cloud video data.

The transmitter 10003 according to the embodiments transmits the bitstream containing the encoded point cloud video data. The bitstream according to the embodiments is encapsulated in a file or segment (for example, a streaming segment), and is transmitted over various networks such as a broadcasting network and/or a broadband network. Although not shown in the figure, the transmission device 10000 may include an encapsulator (or an encapsulation module) configured to perform an encapsulation operation. According to embodiments, the encapsulator may be included in the transmitter 10003. According to embodiments, the file or segment may be transmitted to the reception device 10004 over a network, or stored in a digital storage medium (e.g., USB, SD, CD, DVD, Blu-ray, HDD, SSD, etc.). The transmitter 10003 according to the embodiments is capable of wired/wireless communication with the reception device 10004 (or the receiver 10005) over a network of 4G, 5G, 6G, etc. In addition, the transmitter may perform a necessary data processing operation according to the network system (e.g., a 4G, 5G or 6G communication network system). The transmission device 10000 may transmit the encapsulated data in an on-demand manner.

The reception device 10004 according to the embodiments includes a receiver 10005, a point cloud video decoder 10006, and/or a renderer 10007. According to embodiments, the reception device 10004 may include a device, a robot, a vehicle, an AR/VR/XR device, a portable device, a home appliance, an Internet of Things (IoT) device, and an AI device/server which are configured to perform communication with a base station and/or other wireless devices using a radio access technology (e.g., 5G New RAT (NR), Long Term Evolution (LTE)).

The receiver 10005 according to the embodiments receives the bitstream containing the point cloud video data or the file/segment in which the bitstream is encapsulated from the network or storage medium. The receiver 10005 may perform necessary data processing according to the network system (for example, a communication network system of 4G, 5G, 6G, etc.). The receiver 10005 according to the embodiments may decapsulate the received file/segment and output a bitstream. According to embodiments, the receiver 10005 may include a decapsulator (or a decapsulation module) configured to perform a decapsulation operation. The decapsulator may be implemented as an element (or component) separate from the receiver 10005.

The point cloud video decoder 10006 decodes the bitstream containing the point cloud video data. The point cloud video decoder 10006 may decode the point cloud video data according to the method by which the point cloud video data is encoded (for example, in a reverse process of the operation of the point cloud video encoder 10002). Accordingly, the point cloud video decoder 10006 may decode the point cloud video data by performing point cloud decompression coding, which is the inverse process of the point cloud compression. The point cloud decompression coding includes G-PCC coding.

The renderer 10007 renders the decoded point cloud video data. The renderer 10007 may output point cloud content by rendering not only the point cloud video data but also audio data. According to embodiments, the renderer 10007 may include a display configured to display the point cloud content. According to embodiments, the display may be implemented as a separate device or component rather than being included in the renderer 10007.

The arrows indicated by dotted lines in the drawing represent a transmission path of feedback information acquired by the reception device 10004. The feedback information is information for reflecting interactivity with a user who consumes the point cloud content, and includes information about the user (e.g., head orientation information, viewport information, and the like). In particular, when the point cloud content is content for a service (e.g., self-driving service, etc.) that requires interaction with the user, the feedback information may be provided to the content transmitting side (e.g., the transmission device 10000) and/ or the service provider. According to embodiments, the feedback information may be used in the reception device 10004 as well as the transmission device 10000, or may not be provided.

The head orientation information according to embodiments is information about the user's head position, orientation, angle, motion, and the like. The reception device 10004 according to the embodiments may calculate the viewport information based on the head orientation information. The viewport information may be information about a region of a point cloud video that the user is viewing. A viewpoint is a point through which the user is viewing the point cloud video, and may refer to a center point of the viewport region. That is, the viewport is a region centered on the viewpoint, and the size and shape of the region may be determined by a field of view (FOV). Accordingly, the reception device 10004 may extract the viewport information based on a vertical or horizontal FOV supported by the device in addition to the head orientation information. Also, the reception device 10004 performs gaze analysis or the like to check the way the user consumes a point cloud, a region that the user gazes at in the point cloud video, a gaze time, and the like. According to embodiments, the reception device 10004 may transmit feedback information including the result of the gaze analysis to the transmission device 10000. The feedback information according to the embodiments may be acquired in the rendering and/or display process. The feedback information according to the embodiments may be secured by one or more sensors included in the reception device 10004. According to embodiments, the feedback information may be secured by the renderer 10007 or a separate external element (or device, component, or the like). The dotted lines in FIG. 1 represent a process of transmitting the feedback information secured by the renderer 10007. The point cloud content providing system may process (encode/decode) point cloud data based on the feedback information. Accordingly, the point cloud video data decoder 10006 may perform a decoding operation based on the feedback information. The reception device 10004 may transmit the feedback information to the transmission device 10000. The transmission device 10000 (or the point cloud video data encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) the entire point cloud data, and provide point cloud content to the user.

According to embodiments, the transmission device 10000 may be called an encoder, a transmission device, a transmitter, or the like, and the reception device 10004 may be called a decoder, a receiving device, a receiver, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to the point cloud data.

The elements of the point cloud content providing system illustrated in FIG. 1 may be implemented by hardware, software, a processor, and/or a combination thereof.

Figure 2:
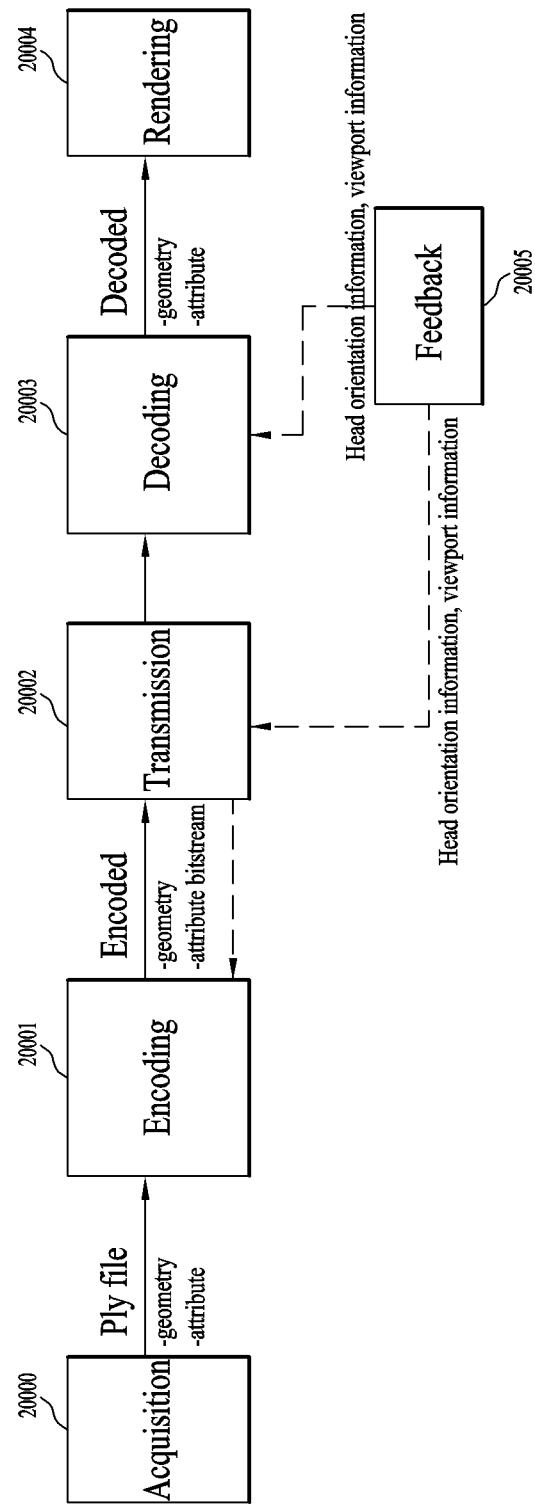
FIG. 2 is a block diagram illustrating a point cloud content providing operation according to embodiments.

FIG. 2 is a block diagram illustrating a point cloud content providing operation according to embodiments.

The block diagram of FIG. 2 shows the operation of the point cloud content providing system described in FIG. 1. As described above, the point cloud content providing system may process point cloud data based on point cloud compression coding (e.g., G-PCC).

The point cloud content providing system according to the embodiments (for example, the point cloud transmission device 10000 or the point cloud video acquirer 10001) may acquire a point cloud video (20000). The point cloud video is represented by a point cloud belonging to a coordinate system for expressing a 3D space. The point cloud video according to the embodiments may include a Ply (Polygon File format or the Stanford Triangle format) file. When the point cloud video has one or more frames, the acquired point cloud video may include one or more Ply files. The Ply files contain point cloud data, such as point geometry and/or attributes. The geometry includes positions of points. The position of each point may be represented by parameters (for example, values of the X, Y, and Z axes) representing a three-dimensional coordinate system (e.g., a coordinate system composed of X, Y and Z axes). The attributes include attributes of points (e.g., information about texture, color (in YCbCr or RGB), reflectance r, transparency, etc. of each point). A point has one or more attributes. For example, a point may have an attribute that is a color, or two attributes that are color and reflectance. According to embodiments, the geometry may be called positions, geometry information, geometry data, or the like, and the attribute may be called attributes, attribute information, attribute data, or the like. The point cloud content providing system (for example, the point cloud transmission device 10000 or the point cloud video acquirer 10001) may secure point cloud data from information (e.g., depth information, color information, etc.) related to the acquisition process of the point cloud video.

The point cloud content providing system (for example, the transmission device 10000 or the point cloud video encoder 10002) according to the embodiments may encode the point cloud data (20001). The point cloud content providing system may encode the point cloud data based on point cloud compression coding. As described above, the point cloud data may include the geometry and attributes of a point. Accordingly, the point cloud content providing system may perform geometry encoding of encoding the geometry and output a geometry bitstream. The point cloud content providing system may perform attribute encoding of encoding attributes and output an attribute bitstream.

According to embodiments, the point cloud content providing system may perform the attribute encoding based on the geometry encoding. The geometry bitstream and the attribute bitstream according to the embodiments may be multiplexed and output as one bitstream. The bitstream according to the embodiments may further contain signaling information related to the geometry encoding and attribute encoding.

The point cloud content providing system (for example, the transmission device 10000 or the transmitter 10003) according to the embodiments may transmit the encoded point cloud data (20002). As illustrated in FIG. 1, the encoded point cloud data may be represented by a geometry bitstream and an attribute bitstream. In addition, the encoded point cloud data may be transmitted in the form of a bitstream together with signaling information related to encoding of the point cloud data (for example, signaling information related to the geometry encoding and the attribute encoding). The point cloud content providing system may encapsulate a bitstream that carries the encoded point cloud data and transmit the same in the form of a file or segment.

The point cloud content providing system (for example, the reception device 10004 or the receiver 10005) according to the embodiments may receive the bitstream containing the encoded point cloud data. In addition, the point cloud content providing system (for example, the reception device 10004 or the receiver 10005) may demultiplex the bitstream.

The point cloud content providing system (e.g., the reception device 10004 or the point cloud video decoder 10005) may decode the encoded point cloud data (e.g., the geometry bitstream, the attribute bitstream) transmitted in the bitstream. The point cloud content providing system (for example, the reception device 10004 or the point cloud video decoder 10005) may decode the point cloud video data based on the signaling information related to encoding of the point cloud video data contained in the bitstream. The point cloud content providing system (for example, the reception device 10004 or the point cloud video decoder 10005) may decode the geometry bitstream to reconstruct the positions (geometry) of points. The point cloud content providing system may reconstruct the attributes of the points by decoding the attribute bitstream based on the reconstructed geometry. The point cloud content providing system (for example, the reception device 10004 or the point cloud video decoder 10005) may reconstruct the point cloud video based on the positions according to the reconstructed geometry and the decoded attributes.

The point cloud content providing system according to the embodiments (for example, the reception device 10004 or the renderer 10007) may render the decoded point cloud data (20004). The point cloud content providing system (for example, the reception device 10004 or the renderer 10007) may render the geometry and attributes decoded through the decoding process, using various rendering methods. Points in the point cloud content may be rendered to a vertex having a certain thickness, a cube having a specific minimum size centered on the corresponding vertex position, or a circle centered on the corresponding vertex position. All or part of the rendered point cloud content is provided to the user through a display (e.g., a VR/AR display, a general display, etc.).

The point cloud content providing system (for example, the reception device 10004) according to the embodiments may secure feedback information (20005). The point cloud content providing system may encode and/or decode point cloud data based on the feedback information. The feedback information and the operation of the point cloud content providing system according to the embodiments are the same as the feedback information and the operation described with reference to FIG. 1, and thus detailed description thereof is omitted.

Figure 3:
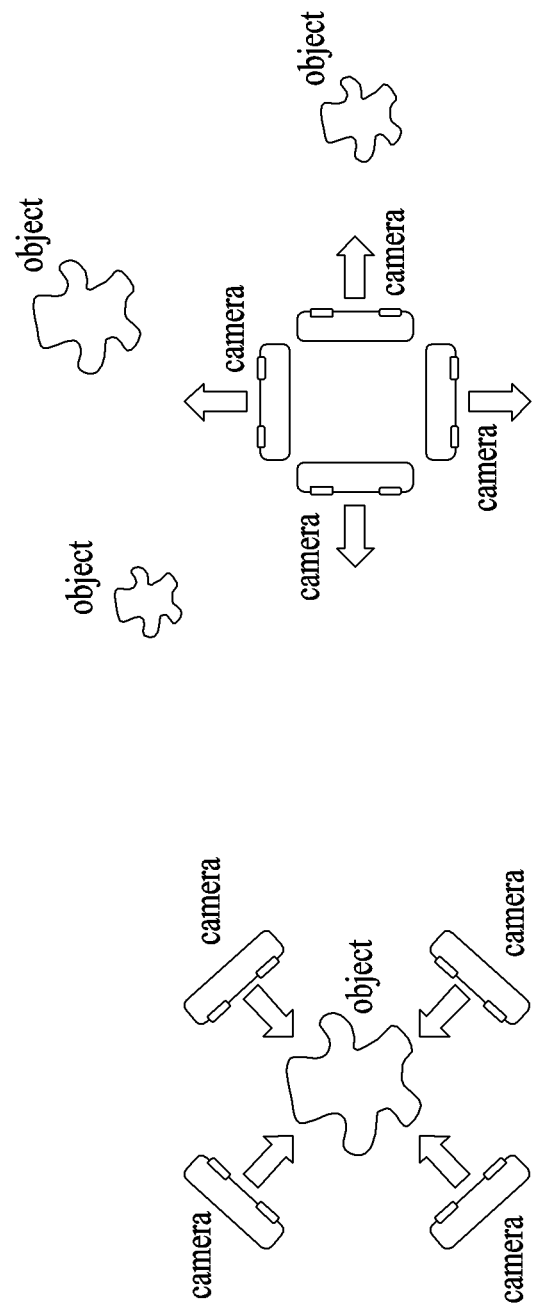
FIG. 3 illustrates an exemplary process of capturing a point cloud video according to embodiments.

FIG. 3 illustrates an exemplary process of capturing a point cloud video according to embodiments.

FIG. 3 illustrates an exemplary point cloud video capture process of the point cloud content providing system described with reference to FIGS. 1 to 2.

Point cloud content includes a point cloud video (images and/or videos) representing an object and/or environment located in various 3D spaces (e.g., a 3D space representing a real environment, a 3D space representing a virtual environment, etc.). Accordingly, the point cloud content providing system according to the embodiments may capture a point cloud video using one or more cameras (e.g., an infrared camera capable of securing depth information, an RGB camera capable of extracting color information corresponding to the depth information, etc.), a projector (e.g., an infrared pattern projector to secure depth information), a LiDAR, or the like. The point cloud content providing system according to the embodiments may extract the shape of geometry composed of points in a 3D space from the depth information and extract the attributes of each point from the color information to secure point cloud data. An image and/or video according to the embodiments may be captured based on at least one of the inward-facing technique and the outward-facing technique.

The left part of FIG. 3 illustrates the inward-facing technique. The inward-facing technique refers to a technique of capturing images a central object with one or more cameras (or camera sensors) positioned around the central object. The inward-facing technique may be used to generate point cloud content providing a 360-degree image of a key object to the user (e.g., VR/AR content providing a 360-degree image of an object (e.g., a key object such as a character, player, object, or actor) to the user).

The right part of FIG. 3 illustrates the outward-facing technique. The outward-facing technique refers to a technique of capturing images an environment of a central object rather than the central object with one or more cameras (or camera sensors) positioned around the central object. The outward-facing technique may be used to generate point cloud content for providing a surrounding environment that appears from the user's point of view (e.g., content representing an external environment that may be provided to a user of a self-driving vehicle).

As shown in the figure, the point cloud content may be generated based on the capturing operation of one or more cameras. In this case, the coordinate system may differ among the cameras, and accordingly the point cloud content providing system may calibrate one or more cameras to set a global coordinate system before the capturing operation. In addition, the point cloud content providing system may generate point cloud content by synthesizing an arbitrary image and/or video with an image and/or video captured by the above-described capture technique. The point cloud content providing system may not perform the capturing operation described in FIG. 3 when it generates point cloud content representing a virtual space. The point cloud content providing system according to the embodiments may perform post-processing on the captured image and/or video. In other words, the point cloud content providing system may remove an unwanted area (for example, a background), recognize a space to which the captured images and/or videos are connected, and, when there is a spatial hole, perform an operation of filling the spatial hole.

The point cloud content providing system may generate one piece of point cloud content by performing coordinate transformation on points of the point cloud video secured from each camera. The point cloud content providing system may perform coordinate transformation on the points based on the coordinates of the position of each camera. Accordingly, the point cloud content providing system may generate content representing one wide range, or may generate point cloud content having a high density of points.

Figure 4:
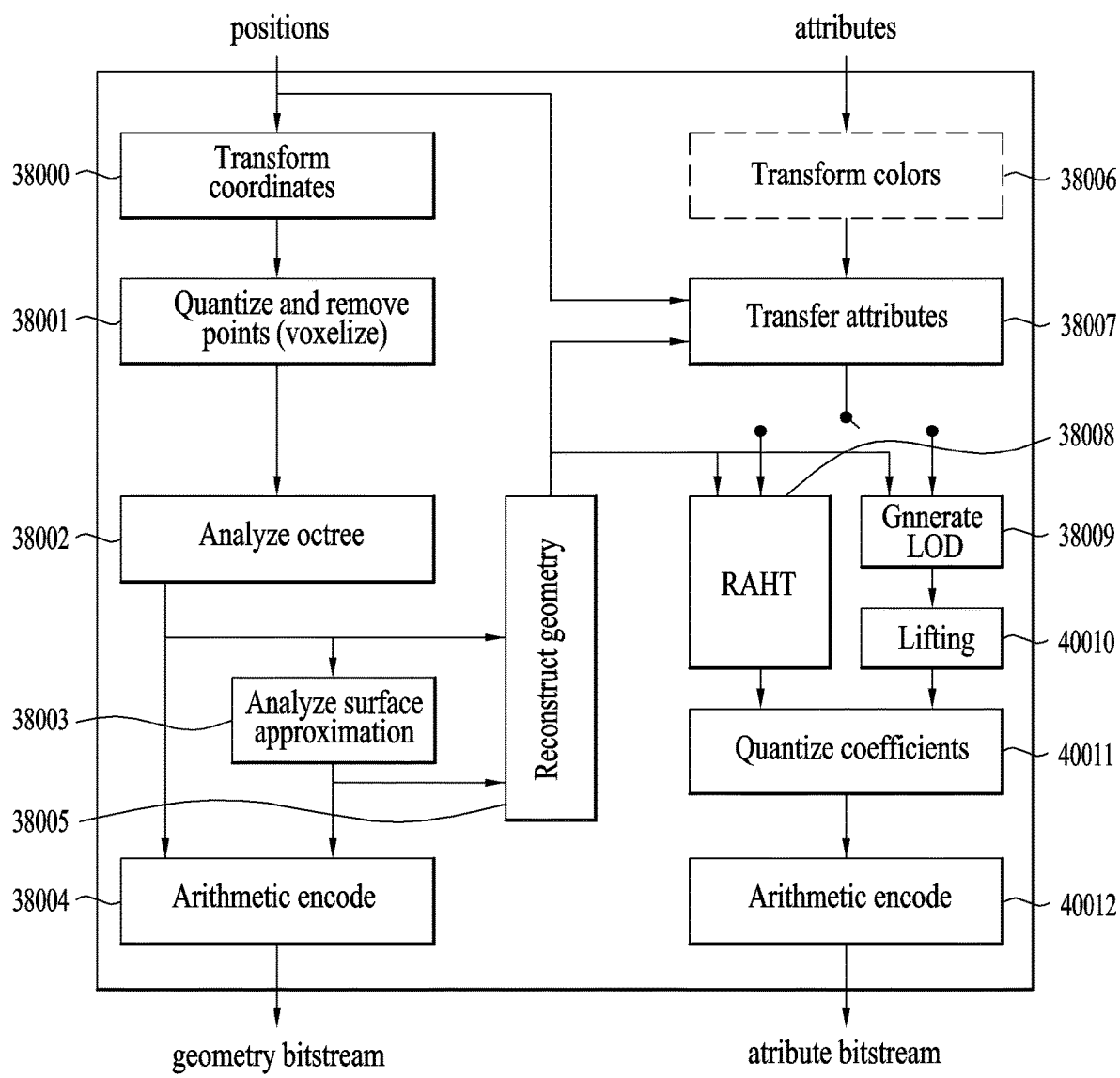
FIG. 4 illustrates an exemplary point cloud encoder according to embodiments.

FIG. 4 illustrates an exemplary point cloud encoder according to embodiments.

FIG. 4 shows an example of the point cloud video encoder 10002 of FIG. 1. The point cloud encoder reconstructs and encodes point cloud data (e.g., positions and/or attributes of the points) to adjust the quality of the point cloud content (to, for example, lossless, lossy, or near-lossless) according to the network condition or applications. When the overall size of the point cloud content is large (e.g., point cloud content of 60 Gbps is given for 30 fps), the point cloud content providing system may fail to stream the content in real time. Accordingly, the point cloud content providing system may reconstruct the point cloud content based on the maximum target bitrate to provide the same in accordance with the network environment or the like.

As described with reference to FIGS. 1 to 2, the point cloud encoder may perform geometry encoding and attribute encoding. The geometry encoding is performed before the attribute encoding.

The point cloud encoder according to the embodiments includes a coordinate transformer (Transform coordinates) 40000, a quantizer (Quantize and remove points (voxelize)) 40001, an octree analyzer (Analyze octree) 40002, and a surface approximation analyzer (Analyze surface approximation) 40003, an arithmetic encoder (Arithmetic encode) 40004, a geometric reconstructor (Reconstruct geometry) 40005, a color transformer (Transform colors) 40006, an attribute transformer (Transform attributes) 40007, a RAHT transformer (RAHT) 40008, an LOD generator (Generate LOD) 40009, a lifting transformer (Lifting) 40010, a coefficient quantizer (Quantize coefficients) 40011, and/or an arithmetic encoder (Arithmetic encode) 40012.

The coordinate transformer 40000, the quantizer 40001, the octree analyzer 40002, the surface approximation analyzer 40003, the arithmetic encoder 40004, and the geometry reconstructor 40005 may perform geometry encoding. The geometry encoding according to the embodiments may include octree geometry coding, direct coding, trisoup geometry encoding, and entropy encoding. The direct coding and trisoup geometry encoding are applied selectively or in combination. The geometry encoding is not limited to the above-described example.

As shown in the figure, the coordinate transformer 40000 according to the embodiments receives positions and transforms the same into coordinates. For example, the positions may be transformed into position information in a three-dimensional space (for example, a three-dimensional space represented by an XYZ coordinate system). The position information in the three-dimensional space according to the embodiments may be referred to as geometry information.

The quantizer 40001 according to the embodiments quantizes the geometry. For example, the quantizer 40001 may quantize the points based on a minimum position value of all points (for example, a minimum value on each of the X, Y, and Z axes). The quantizer 40001 performs a quantization operation of multiplying the difference between the minimum position value and the position value of each point by a preset quantization scale value and then finding the nearest integer value by rounding the value obtained through the multiplication. Thus, one or more points may have the same quantized position (or position value). The quantizer 40001 according to the embodiments performs voxelization based on the quantized positions to reconstruct quantized points. As in the case of a pixel, which is the minimum unit containing 2D image/video information, points of point cloud content (or 3D point cloud video) according to the embodiments may be included in one or more voxels. The term voxel, which is a compound of volume and pixel, refers to a 3D cubic space generated when a 3D space is divided into units (unit=1.0) based on the axes representing the 3D space (e.g., X-axis, Y-axis, and Z-axis). The quantizer 40001 may match groups of points in the 3D space with voxels. According to embodiments, one voxel may include only one point. According to embodiments, one voxel may include one or more points. In order to express one voxel as one point, the position of the center of a voxel may be set based on the positions of one or more points included in the voxel. In this case, attributes of all positions included in one voxel may be combined and assigned to the voxel.

The octree analyzer 40002 according to the embodiments performs octree geometry coding (or octree coding) to present voxels in an octree structure. The octree structure represents points matched with voxels, based on the octal tree structure.

The surface approximation analyzer 40003 according to the embodiments may analyze and approximate the octree. The octree analysis and approximation according to the embodiments is a process of analyzing a region containing a plurality of points to efficiently provide octree and voxelization.

The arithmetic encoder 40004 according to the embodiments performs entropy encoding on the octree and/or the approximated octree. For example, the encoding scheme includes arithmetic encoding. As a result of the encoding, a geometry bitstream is generated.

The color transformer 40006, the attribute transformer 40007, the RAHT transformer 40008, the LOD generator 40009, the lifting transformer 40010, the coefficient quantizer 40011, and/or the arithmetic encoder 40012 perform attribute encoding. As described above, one point may have one or more attributes. The attribute encoding according to the embodiments is equally applied to the attributes that one point has. However, when an attribute (e.g., color) includes one or more elements, attribute encoding is independently applied to each element. The attribute encoding according to the embodiments includes color transform coding, attribute transform coding, region adaptive hierarchical transform (RAHT) coding, interpolation-based hierarchical nearest-neighbor prediction (prediction transform) coding, and interpolation-based hierarchical nearest-neighbor prediction with an update/lifting step (lifting transform) coding. Depending on the point cloud content, the RAHT coding, the prediction transform coding and the lifting transform coding described above may be selectively used, or a combination of one or more of the coding schemes may be used. The attribute encoding according to the embodiments is not limited to the above-described example.

The color transformer 40006 according to the embodiments performs color transform coding of transforming color values (or textures) included in the attributes. For example, the color transformer 40006 may transform the format of color information (for example, from RGB to YCbCr). The operation of the color transformer 40006 according to embodiments may be optionally applied according to the color values included in the attributes.

The geometry reconstructor 40005 according to the embodiments reconstructs (decompresses) the octree and/or the approximated octree. The geometry reconstructor 40005 reconstructs the octree/voxels based on the result of analyzing the distribution of points. The reconstructed octree/voxels may be referred to as reconstructed geometry (restored geometry).

The attribute transformer 40007 according to the embodiments performs attribute transformation to transform the attributes based on the reconstructed geometry and/or the positions on which geometry encoding is not performed. As described above, since the attributes are dependent on the geometry, the attribute transformer 40007 may transform the attributes based on the reconstructed geometry information. For example, based on the position value of a point included in a voxel, the attribute transformer 40007 may transform the attribute of the point at the position. As described above, when the position of the center of a voxel is set based on the positions of one or more points included in the voxel, the attribute transformer 40007 transforms the attributes of the one or more points. When the trisoup geometry encoding is performed, the attribute transformer 40007 may transform the attributes based on the trisoup geometry encoding.

The attribute transformer 40007 may perform the attribute transformation by calculating the average of attributes or attribute values of neighboring points (e.g., color or reflectance of each point) within a specific position/radius from the position (or position value) of the center of each voxel. The attribute transformer 40007 may apply a weight according to the distance from the center to each point in calculating the average. Accordingly, each voxel has a position and a calculated attribute (or attribute value).

The attribute transformer 40007 may search for neighboring points existing within a specific position/radius from the position of the center of each voxel based on the K-D tree or the Morton code. The K-D tree is a binary search tree and supports a data structure capable of managing points based on the positions such that nearest neighbor search (NNS) can be performed quickly. The Morton code is generated by presenting coordinates (e.g., (x, y, z)) representing 3D positions of all points as bit values and mixing the bits. For example, when the coordinates representing the position of a point are (5, 9, 1), the bit values for the coordinates are (0101, 1001, 0001). Mixing the bit values according to the bit index in order of z, y, and x yields 010001000111. This value is expressed as a decimal number of 1095. That is, the Morton code value of the point having coordinates (5, 9, 1) is 1095. The attribute transformer 40007 may order the points based on the Morton code values and perform NNS through a depth-first traversal process. After the attribute transformation operation, the K-D tree or the Morton code is used when the NNS is needed in another transformation process for attribute coding.

As shown in the figure, the transformed attributes are input to the RAHT transformer 40008 and/or the LOD generator 40009.

The RAHT transformer 40008 according to the embodiments performs RAHT coding for predicting attribute information based on the reconstructed geometry information. For example, the RAHT transformer 40008 may predict attribute information of a node at a higher level in the octree based on the attribute information associated with a node at a lower level in the octree.

The LOD generator 40009 according to the embodiments generates a level of detail (LOD) to perform prediction transform coding. The LOD according to the embodiments is a degree of detail of point cloud content. As the LOD value decrease, it indicates that the detail of the point cloud content is degraded. As the LOD value increases, it indicates that the detail of the point cloud content is enhanced. Points may be classified by the LOD.

The lifting transformer 40010 according to the embodiments performs lifting transform coding of transforming the attributes a point cloud based on weights. As described above, lifting transform coding may be optionally applied.

The coefficient quantizer 40011 according to the embodiments quantizes the attribute-coded attributes based on coefficients.

The arithmetic encoder 40012 according to the embodiments encodes the quantized attributes based on arithmetic coding.

Although not shown in the figure, the elements of the point cloud encoder of FIG. 4 may be implemented by hardware including one or more processors or integrated circuits configured to communicate with one or more memories included in the point cloud providing device, software, firmware, or a combination thereof. The one or more processors may perform at least one of the operations and/or functions of the elements of the point cloud encoder of FIG. 4 described above. Additionally, the one or more processors may operate or execute a set of software programs and/or instructions for performing the operations and/or functions of the elements of the point cloud encoder of FIG. 4. The one or more memories according to the embodiments may include a high speed random access memory, or include a non-volatile memory (e.g., one or more magnetic disk storage devices, flash memory devices, or other non-volatile solid-state memory devices).

Figure 5:
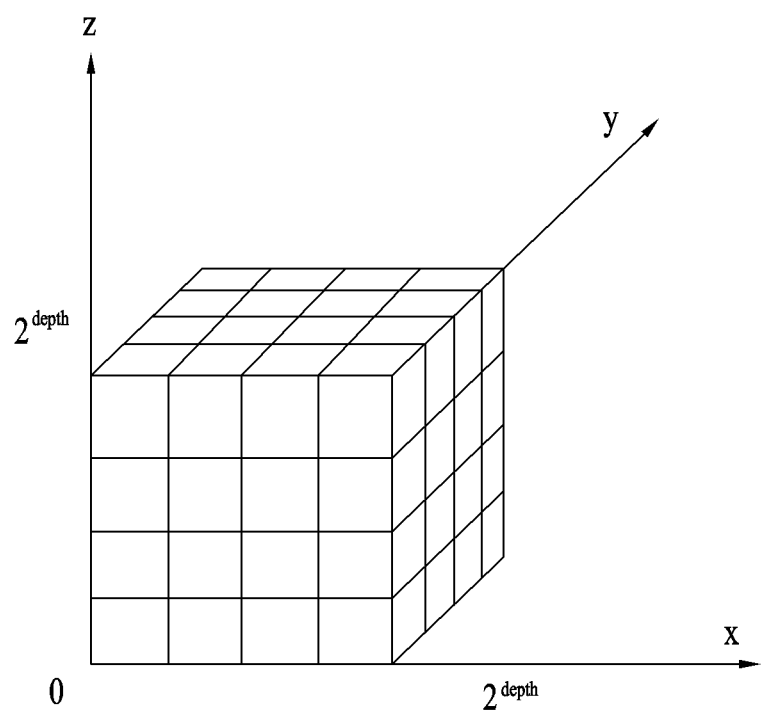
FIG. 5 shows an example of voxels according to embodiments.

FIG. 5 shows an example of voxels according to embodiments.

FIG. 5 shows voxels positioned in a 3D space represented by a coordinate system composed of three axes, which are the X-axis, the Y-axis, and the Z-axis. As described with reference to FIG. 4, the point cloud encoder (e.g., the quantizer 40001) may perform voxelization. Voxel refers to a 3D cubic space generated when a 3D space is divided into units (unit=1.0) based on the axes representing the 3D space (e.g., X-axis, Y-axis, and Z-axis). FIG. 5 shows an example of voxels generated through an octree structure in which a cubical axis-aligned bounding box defined by two poles (0, 0, 0) and (2d, 2d, 2d) is recursively subdivided. One voxel includes at least one point. The spatial coordinates of a voxel may be estimated from the positional relationship with a voxel group. As described above, a voxel has an attribute (such as color or reflectance) like pixels of a 2D image/video. The details of the voxel are the same as those described with reference to FIG. 4, and therefore a description thereof is omitted.

FIG. 6 shows an example of an octree and occupancy code according to embodiments.

As described with reference to FIGS. 1 to 4, the point cloud content providing system (point cloud video encoder 10002) or the point cloud encoder (for example, the octree analyzer 40002) performs octree geometry coding (or octree coding) based on an octree structure to efficiently manage the region and/or position of the voxel.

The upper part of FIG. 6 shows an octree structure. The 3D space of the point cloud content according to the embodiments is represented by axes (e.g., X-axis, Y-axis, and Z-axis) of the coordinate system. The octree structure is created by recursive subdividing of a cubical axis-aligned bounding box defined by two poles (0, 0, 0) and $(2^d, 2^d, 2^d)$.

Here, $2^d$ may be set to a value constituting the smallest bounding box surrounding all points of the point cloud content (or point cloud video). Here, d denotes the depth of the octree. The value of d is determined in the following equation. In the following equation, ($x^{int}n$, $y^{int}n$, $z^{int}n$) denotes the positions (or position values) of quantized points.

$$d = \mathrm{Ceil}(\mathrm{Log2}(\mathrm{Max}(x_n^{int}, y_n^{int}, z_n^{int}, n = 1, \ldots, N) + 1))$$

As shown in the middle of the upper part of FIG. 6, the entire 3D space may be divided into eight spaces according to partition. Each divided space is represented by a cube with six faces. As shown in the upper right of FIG. 6, each of the eight spaces is divided again based on the axes of the coordinate system (e.g., X-axis, Y-axis, and Z-axis). Accordingly, each space is divided into eight smaller spaces. The divided smaller space is also represented by a cube with six faces. This partitioning scheme is applied until the leaf node of the octree becomes a voxel.

The lower part of FIG. 6 shows an octree occupancy code. The occupancy code of the octree is generated to indicate whether each of the eight divided spaces generated by dividing one space contains at least one point. Accordingly, a single occupancy code is represented by eight child nodes. Each child node represents the occupancy of a divided space, and the child node has a value in 1 bit. Accordingly, the occupancy code is represented as an 8-bit code. That is, when at least one point is contained in the space corresponding to a child node, the node is assigned a value of 1. When no point is contained in the space corresponding to the child node (the space is empty), the node is assigned a value of 0. Since the occupancy code shown in FIG. 6 is 00100001, it indicates that the spaces corresponding to the third child node and the eighth child node among the eight child nodes each contain at least one point. As shown in the figure, each of the third child node and the eighth child node has eight child nodes, and the child nodes are represented by an 8-bit occupancy code. The figure shows that the occupancy code of the third child node is 10000111, and the occupancy code of the eighth child node is 01001111. The point cloud encoder (for example, the arithmetic encoder 40004) according to the embodiments may perform entropy encoding on the occupancy codes. In order to increase the compression efficiency, the point cloud encoder may perform intra/inter-coding on the occupancy codes. The reception device (for example, the reception device 10004 or the point cloud video decoder 10006) according to the embodiments reconstructs the octree based on the occupancy codes.

The point cloud encoder (for example, the point cloud encoder of FIG. 4 or the octree analyzer 40002) according to the embodiments may perform voxelization and octree coding to store the positions of points. However, points are not always evenly distributed in the 3D space, and accordingly there may be a specific region in which fewer points are present. Accordingly, it is inefficient to perform voxelization for the entire 3D space. For example, when a specific region contains few points, voxelization does not need to be performed in the specific region.

Accordingly, for the above-described specific region (or a node other than the leaf node of the octree), the point cloud encoder according to the embodiments may skip voxelization and perform direct coding to directly code the positions of points included in the specific region. The coordinates of a direct coding point according to the embodiments are referred to as direct coding mode (DCM). The point cloud encoder according to the embodiments may also perform trisoup geometry encoding, which is to reconstruct the positions of the points in the specific region (or node) based on voxels, based on a surface model. The trisoup geometry encoding is geometry encoding that represents an object as a series of triangular meshes. Accordingly, the point cloud decoder may generate a point cloud from the mesh surface. The direct coding and trisoup geometry encoding according to the embodiments may be selectively performed. In addition, the direct coding and trisoup geometry encoding according to the embodiments may be performed in combination with octree geometry coding (or octree coding).

To perform direct coding, the option to use the direct mode for applying direct coding should be activated. A node to which direct coding is to be applied is not a leaf node, and points less than a threshold should be present within a specific node. In addition, the total number of points to which direct coding is to be applied should not exceed a preset threshold. When the conditions above are satisfied, the point cloud encoder (or the arithmetic encoder 40004) according to the embodiments may perform entropy coding on the positions (or position values) of the points.

The point cloud encoder (for example, the surface approximation analyzer 40003) according to the embodiments may determine a specific level of the octree (a level less than the depth d of the octree), and the surface model may be used staring with that level to perform trisoup geometry encoding to reconstruct the positions of points in the region of the node based on voxels (Trisoup mode). The point cloud encoder according to the embodiments may specify a level at which trisoup geometry encoding is to be applied. For example, when the specific level is equal to the depth of the octree, the point cloud encoder does not operate in the trisoup mode. In other words, the point cloud encoder according to the embodiments may operate in the trisoup mode only when the specified level is less than the value of depth of the octree. The 3D cube region of the nodes at the specified level according to the embodiments is called a block. One block may include one or more voxels. The block or voxel may correspond to a brick. Geometry is represented as a surface within each block. The surface according to embodiments may intersect with each edge of a block at most once.

One block has 12 edges, and accordingly there are at least 12 intersections in one block. Each intersection is called a vertex (or apex). A vertex present along an edge is detected when there is at least one occupied voxel adjacent to the edge among all blocks sharing the edge. The occupied voxel according to the embodiments refers to a voxel containing a point. The position of the vertex detected along the edge is the average position along the edge of all voxels adjacent to the edge among all blocks sharing the edge.

Once the vertex is detected, the point cloud encoder according to the embodiments may perform entropy encoding on the starting point (x, y, z) of the edge, the direction vector ($\Delta x$, $\Delta y$, $\Delta z$) of the edge, and the vertex position value (relative position value within the edge). When the trisoup geometry encoding is applied, the point cloud encoder according to the embodiments (for example, the geometry reconstructor 40005) may generate restored geometry (reconstructed geometry) by performing the triangle reconstruction, up-sampling, and voxelization processes.

The vertices positioned at the edge of the block determine a surface that passes through the block. The surface according to the embodiments is a non-planar polygon. In the triangle reconstruction process, a surface represented by a triangle is reconstructed based on the starting point of the edge, the direction vector of the edge, and the position values of the vertices. The triangle reconstruction process is performed by: i) calculating the centroid value of each vertex, ii) subtracting the center value from each vertex value, and iii) estimating the sum of the squares of the values obtained by the subtraction.

$$\text{i)} \begin{bmatrix} \mu_x \\ \mu_y \\ \mu_z \end{bmatrix} = \frac{1}{n} \sum_{i=1}^{n} \begin{bmatrix} x_i \\ y_i \\ z_i \end{bmatrix};$$

$$\text{ii)} \begin{bmatrix} \bar{x}_i \\ \bar{y}_i \\ \bar{z}_i \end{bmatrix} = \begin{bmatrix} x_i \\ y_i \\ z_i \end{bmatrix} - \begin{bmatrix} \mu_x \\ \mu_y \\ \mu_z \end{bmatrix};$$

$$\text{iii)} \begin{bmatrix} \sigma_x^2 \\ \sigma_y^2 \\ \sigma_z^2 \end{bmatrix} = \sum_{i=1}^{n} \begin{bmatrix} \bar{x}_i^2 \\ \bar{y}_i^2 \\ \bar{z}_i^2 \end{bmatrix}$$

The minimum value of the sum is estimated, and the projection process is performed according to the axis with the minimum value. For example, when the element x is the minimum, each vertex is projected on the x-axis with respect to the center of the block, and projected on the (y, z) plane. When the values obtained through projection on the (y, z) plane are (ai, bi), the value of θ is estimated through atan2(bi, ai), and the vertices are ordered based on the value of θ. The table below shows a combination of vertices for creating a triangle according to the number of the vertices. The vertices are ordered from 1 to n. The table below shows that for four vertices, two triangles may be constructed according to combinations of vertices. The first triangle may consist of vertices 1, 2, and 3 among the ordered vertices, and the second triangle may consist of vertices 3, 4, and 1 among the ordered vertices.

TABLE 2-1

| Triangles formed from vertices ordered 1, . . . , n | |
| --- | --- |
| n | triangles |
| 3 | (1,2,3) |
| 4 | (1,2,3), (3,4,1) |
| 5 | (1,2,3), (3,4,5), (5,1,3) |
| 6 | (1,2,3), (3,4,5), (5,6,1), (1,3,5) |
| 7 | (1,2,3), (3,4,5), (5,6,7), (7,1,3), (3,5,7) |
| 8 | (1,2,3), (3,4,5), (5,6,7), (7,8,1), (1,3,5), (5,7,1) |
| 9 | (1,2,3), (3,4,5), (5,6,7), (7,8,9), (9,1,3), (3,5,7), (7,9,3) |
| 10 | (1,2,3), (3,4,5), (5,6,7), (7,8,9), (9,10,1), (1,3,5), (5,7,9), (9,1,5) |
| 11 | (1,2,3), (3,4,5), (5,6,7), (7,8,9), (9,10,11), (11,1,3), (3,5,7), (7,9,11), (11,3,7) |
| 12 | (1,2,3), (3,4,5), (5,6,7), (7,8,9), (9,10,11), (11,12,1), (1,3,5), (5,7,9), (9,11,1), (1,5,9) |

The upsampling process is performed to add points in the middle along the edge of the triangle and perform voxelization. The added points are generated based on the upsampling factor and the width of the block. The added points are called refined vertices. The point cloud encoder according to the embodiments may voxelize the refined vertices. In addition, the point cloud encoder may perform attribute encoding based on the voxelized positions (or position values).

FIG. 7 shows an example of a neighbor node pattern according to embodiments.

In order to increase the compression efficiency of the point cloud video, the point cloud encoder according to the embodiments may perform entropy coding based on context adaptive arithmetic coding.

As described with reference to FIGS. 1 to 6, the point cloud content providing system or the point cloud encoder (for example, the point cloud video encoder 10002, the point cloud encoder or arithmetic encoder 40004 of FIG. 4) may perform entropy coding on the occupancy code immediately. In addition, the point cloud content providing system or the point cloud encoder may perform entropy encoding (intra encoding) based on the occupancy code of the current node and the occupancy of neighboring nodes, or perform entropy encoding (inter encoding) based on the occupancy code of the previous frame. A frame according to embodiments represents a set of point cloud videos generated at the same time. The compression efficiency of intra encoding/inter encoding according to the embodiments may depend on the number of neighboring nodes that are referenced. When the bits increase, the operation becomes complicated, but the encoding may be biased to one side, which may increase the compression efficiency. For example, when a 3-bit context is given, coding needs to be performed using 2³=8 methods. The part divided for coding affects the complexity of implementation. Accordingly, it is necessary to meet an appropriate level of compression efficiency and complexity.

FIG. 7 illustrates a process of obtaining an occupancy pattern based on the occupancy of neighbor nodes. The point cloud encoder according to the embodiments determines occupancy of neighbor nodes of each node of the octree and obtains a value of a neighbor pattern. The neighbor node pattern is used to infer the occupancy pattern of the node. The left part of FIG. 7 shows a cube corresponding to a node (a cube positioned in the middle) and six cubes (neighbor nodes) sharing at least one face with the cube. The nodes shown in the figure are nodes of the same depth. The numbers shown in the figure represent weights (1, 2, 4, 8, 16, and 32) associated with the six nodes, respectively. The weights are assigned sequentially according to the positions of neighboring nodes.

The right part of FIG. 7 shows neighbor node pattern values. A neighbor node pattern value is the sum of values multiplied by the weight of an occupied neighbor node (a neighbor node having a point). Accordingly, the neighbor node pattern values are 0 to 63. When the neighbor node pattern value is 0, it indicates that there is no node having a point (no occupied node) among the neighbor nodes of the node. When the neighbor node pattern value is 63, it indicates that all neighbor nodes are occupied nodes. As shown in the figure, since neighbor nodes to which weights 1, 2, 4, and 8 are assigned are occupied nodes, the neighbor node pattern value is 15, the sum of 1, 2, 4, and 8. The point cloud encoder may perform coding according to the neighbor node pattern value (for example, when the neighbor node pattern value is 63, 64 kinds of coding may be performed). According to embodiments, the point cloud encoder may reduce coding complexity by changing a neighbor node pattern value (for example, based on a table by which 64 is changed to 10 or 6).

Figure 8:
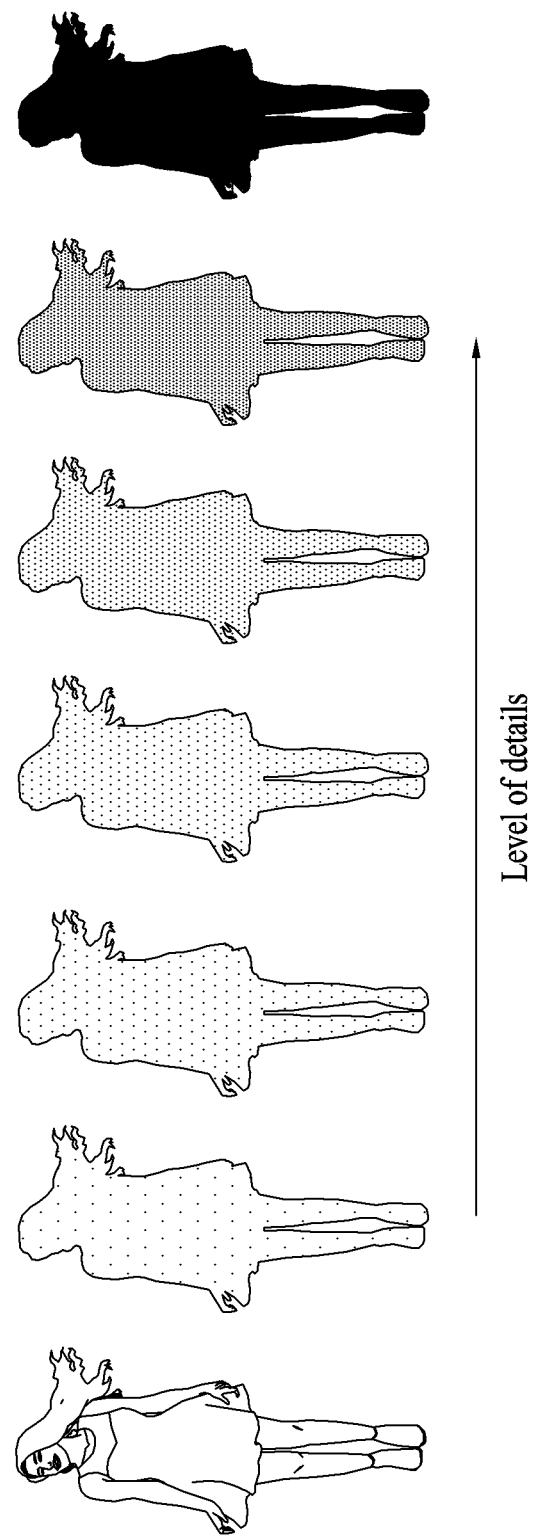
FIG. 8 illustrates an example of point configuration in each LOD according to embodiments.

FIG. 8 illustrates an example of point configuration in each LOD according to embodiments.

As described with reference to FIGS. 1 to 7, encoded geometry is reconstructed (decompressed) before attribute encoding is performed. When direct coding is applied, the geometry reconstruction operation may include changing the placement of direct coded points (e.g., placing the direct coded points in front of the point cloud data). When trisoup geometry encoding is applied, the geometry reconstruction process is performed through triangle reconstruction, up-sampling, and voxelization. Since the attribute depends on the geometry, attribute encoding is performed based on the reconstructed geometry.

The point cloud encoder (for example, the LOD generator 40009) may classify (reorganize) points by LOD. The figure shows the point cloud content corresponding to LODs. The leftmost picture in the figure represents original point cloud content. The second picture from the left of the figure represents distribution of the points in the lowest LOD, and the rightmost picture in the figure represents distribution of the points in the highest LOD. That is, the points in the lowest LOD are sparsely distributed, and the points in the highest LOD are densely distributed. That is, as the LOD rises in the direction pointed by the arrow indicated at the bottom of the figure, the space (or distance) between points is narrowed.

Figure 9:
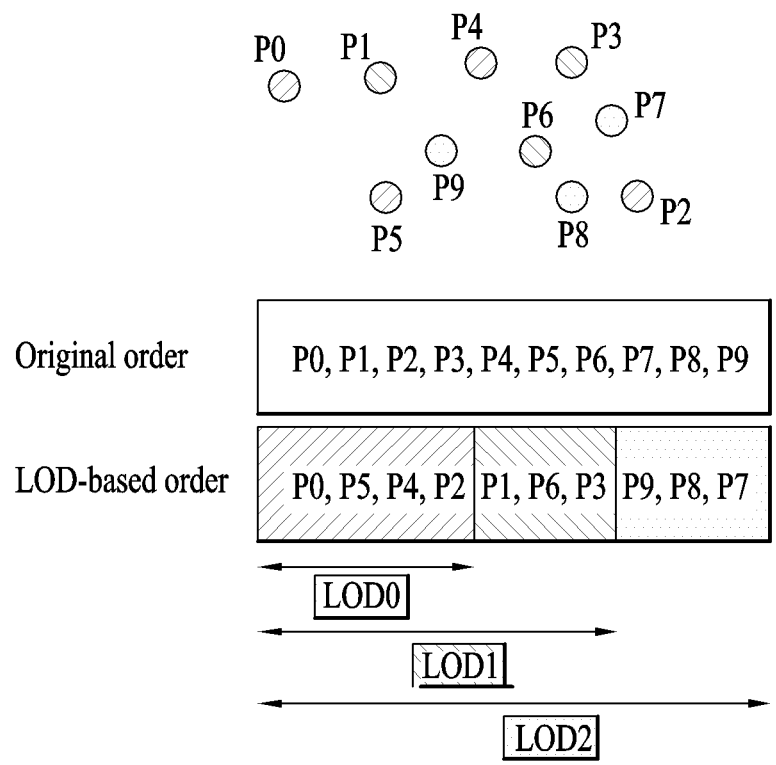
FIG. 9 illustrates an example of point configuration in each LOD according to embodiments.

FIG. 9 illustrates an example of point configuration for each LOD according to embodiments.

As described with reference to FIGS. 1 to 8, the point cloud content providing system, or the point cloud encoder (for example, the point cloud video encoder 10002, the point cloud encoder of FIG. 4, or the LOD generator 40009) may generates an LOD. The LOD is generated by reorganizing the points into a set of refinement levels according to a set LOD distance value (or a set of Euclidean distances). The LOD generation process is performed not only by the point cloud encoder, but also by the point cloud decoder.

The upper part of FIG. 9 shows examples (P0 to P9) of points of the point cloud content distributed in a 3D space. In FIG. 9, the original order represents the order of points P0 to P9 before LOD generation. In FIG. 9, the LOD based order represents the order of points according to the LOD generation. Points are reorganized by LOD. Also, a high LOD contains the points belonging to lower LODs. As shown in FIG. 9, LOD0 contains P0, P5, P4 and P2. LOD1 contains the points of LOD0, P1, P6 and P3. LOD2 contains the points of LOD0, the points of LOD1, P9, P8 and P7.

As described with reference to FIG. 4, the point cloud encoder according to the embodiments may perform prediction transform coding, lifting transform coding, and RAHT transform coding selectively or in combination.

The point cloud encoder according to the embodiments may generate a predictor for points to perform prediction transform coding for setting a predicted attribute (or predicted attribute value) of each point. That is, N predictors may be generated for N points. The predictor according to the embodiments may calculate a weight (=1/distance) based on the LOD value of each point, indexing information about neighboring points present within a set distance for each LOD, and a distance to the neighboring points.

The predicted attribute (or attribute value) according to the embodiments is set to the average of values obtained by multiplying the attributes (or attribute values) (e.g., color, reflectance, etc.) of neighbor points set in the predictor of each point by a weight (or weight value) calculated based on the distance to each neighbor point. The point cloud encoder according to the embodiments (for example, the coefficient quantizer 40011) may quantize and inversely quantize the residuals (which may be called residual attributes, residual attribute values, or attribute prediction residuals) obtained by subtracting a predicted attribute (attribute value) from the attribute (attribute value) of each point. The quantization process is configured as shown in the following table.

| TABLE |
|---|
| Attribute prediction residuals quantization pseudo code |

```
int PCCQuantization(int value, int quantStep) {
    if( value >=0) {
        return floor(value / quantStep + 1.0 / 3.0);
    } else {
        return -floor(-value / quantStep + 1.0 / 3.0);
    }
}
```

| TABLE |
|---|
| Attribute prediction residuals inverse quantization pseudo code |

```
int PCCInverseQuantization(int value, int quantStep) {
    if( quantStep ==0) {
        return value;
    } else {
        return value * quantStep;
    }
}
```

When the predictor of each point has neighbor points, the point cloud encoder (e.g., the arithmetic encoder 40012) according to the embodiments may perform entropy coding on the quantized and inversely quantized residual values as described above. When the predictor of each point has no neighbor point, the point cloud encoder according to the embodiments (for example, the arithmetic encoder 40012) may perform entropy coding on the attributes of the corresponding point without performing the above-described operation.

The point cloud encoder according to the embodiments (for example, the lifting transformer 40010) may generate a predictor of each point, set the calculated LOD and register neighbor points in the predictor, and set weights according to the distances to neighbor points to perform lifting transform coding. The lifting transform coding according to the embodiments is similar to the above-described prediction transform coding, but differs therefrom in that weights are cumulatively applied to attribute values. The process of cumulatively applying weights to the attribute values according to embodiments is configured as follows.

1) Create an array Quantization Weight (QW) for storing the weight value of each point. The initial value of all elements of QW is 1.0. Multiply the QW values of the predictor indexes of the neighbor nodes registered in the predictor by the weight of the predictor of the current point, and add the values obtained by the multiplication.

2) Lift prediction process: Subtract the value obtained by multiplying the attribute value of the point by the weight from the existing attribute value to calculate a predicted attribute value.

3) Create temporary arrays called updateweight and update and initialize the temporary arrays to zero.

4) Cumulatively add the weights calculated by multiplying the weights calculated for all predictors by a weight stored in the QW corresponding to a predictor index to the updateweight array as indexes of neighbor nodes. Cumulatively add, to the update array, a value obtained by multiplying the attribute value of the index of a neighbor node by the calculated weight.

5) Lift update process: Divide the attribute values of the update array for all predictors by the weight value of the updateweight array of the predictor index, and add the existing attribute value to the values obtained by the division.

6) Calculate predicted attributes by multiplying the attribute values updated through the lift update process by the weight updated through the lift prediction process (stored in the QW) for all predictors. The point cloud encoder (e.g., coefficient quantizer 40011) according to the embodiments quantizes the predicted attribute values. In addition, the point cloud encoder (e.g., the arithmetic encoder 40012) performs entropy coding on the quantized attribute values.

The point cloud encoder (for example, the RAHT transformer 40008) according to the embodiments may perform RAHT transform coding in which attributes of nodes of a higher level are predicted using the attributes associated with nodes of a lower level in the octree. RAHT transform coding is an example of attribute intra coding through an octree backward scan. The point cloud encoder according to the embodiments scans the entire region from the voxel and repeats the merging process of merging the voxels into a larger block at each step until the root node is reached. The merging process according to the embodiments is performed only on the occupied nodes. The merging process is not performed on the empty node. The merging process is performed on an upper node immediately above the empty node.

The equation below represents a RAHT transformation matrix. In the equation, $g_{l_{x,y,z}}$ denotes the average attribute value of voxels at level l. $g_{l_{x,y,z}}$ may be calculated based on $g_{l+1_{2x,y,z}}$ and $g_{l+1_{2x+1,y,z}}$. The weights for $g_{l_{2x,y,z}}$ and $g_{l_{2x+1,y,z}}$ are $w1=w_{l_{2x,y,z}}$ and $w2=w_{l_{2x+1,y,z}}$.

$$\begin{bmatrix} g_{l-1_{x,y,z}} \\ h_{l-1_{x,y,z}} \end{bmatrix} = T_{w1w2} \begin{bmatrix} g_{l_{2x,y,z}} \\ g_{l_{2x+1,y,z}} \end{bmatrix},$$

$$T_{w1w2} = \frac{1}{\sqrt{w1+w2}} \begin{bmatrix} \sqrt{w1} & \sqrt{w2} \\ -\sqrt{w2} & \sqrt{w1} \end{bmatrix}$$

Here, $g_{l-1_{x,y,z}}$ is a low-pass value and is used in the merging process at the next higher level. $h_{l-1_{x,y,z}}$ denotes high-pass coefficients. The high-pass coefficients at each step are quantized and subjected to entropy coding (for example, encoding by the arithmetic encoder 400012). The weights are calculated as $w_{l-1_{x,y,z}} = w_{l_{2x,y,z}} + w_{l_{2x+1,y,z}}$. The root node is created through the $g_{1_{0,0,0}}$ and $g_{1_{0,0,1}}$ as follows.

$$\begin{bmatrix} gDC \\ h_{0_{0,0,0}} \end{bmatrix} = T_{w1000w1001} \begin{bmatrix} g_{1_{0,0,0z}} \\ g_{1_{0,0,1}} \end{bmatrix}$$

The value of gDC is also quantized and subjected to entropy coding like the high-pass coefficients.

Figure 10:
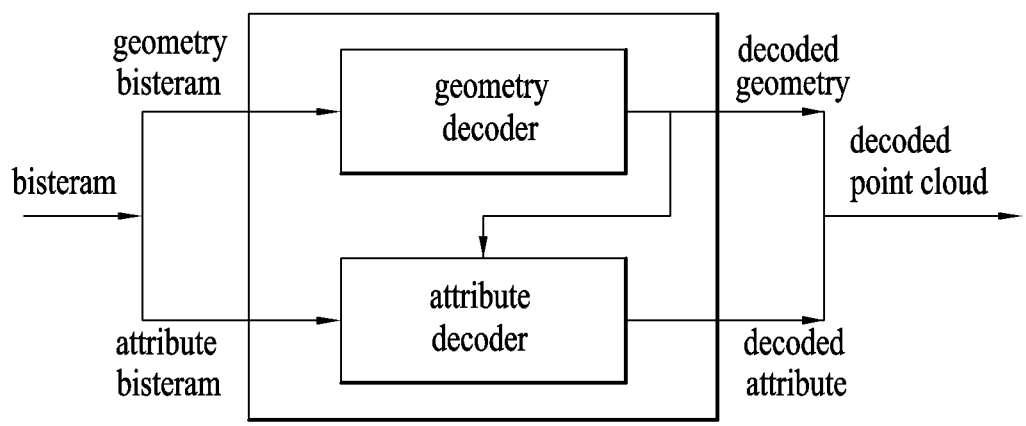
FIG. 10 illustrates a point cloud decoder according to embodiments.

FIG. 10 illustrates a point cloud decoder according to embodiments.

The point cloud decoder illustrated in FIG. 10 is an example of the point cloud video decoder 10006 described in FIG. 1, and may perform the same or similar operations as the operations of the point cloud video decoder 10006 illustrated in FIG. 1. As shown in the figure, the point cloud decoder may receive a geometry bitstream and an attribute bitstream contained in one or more bitstreams. The point cloud decoder includes a geometry decoder and an attribute decoder. The geometry decoder performs geometry decoding on the geometry bitstream and outputs decoded geometry. The attribute decoder performs attribute decoding based on the decoded geometry and the attribute bitstream, and outputs decoded attributes. The decoded geometry and decoded attributes are used to reconstruct point cloud content (a decoded point cloud).

Figure 11:
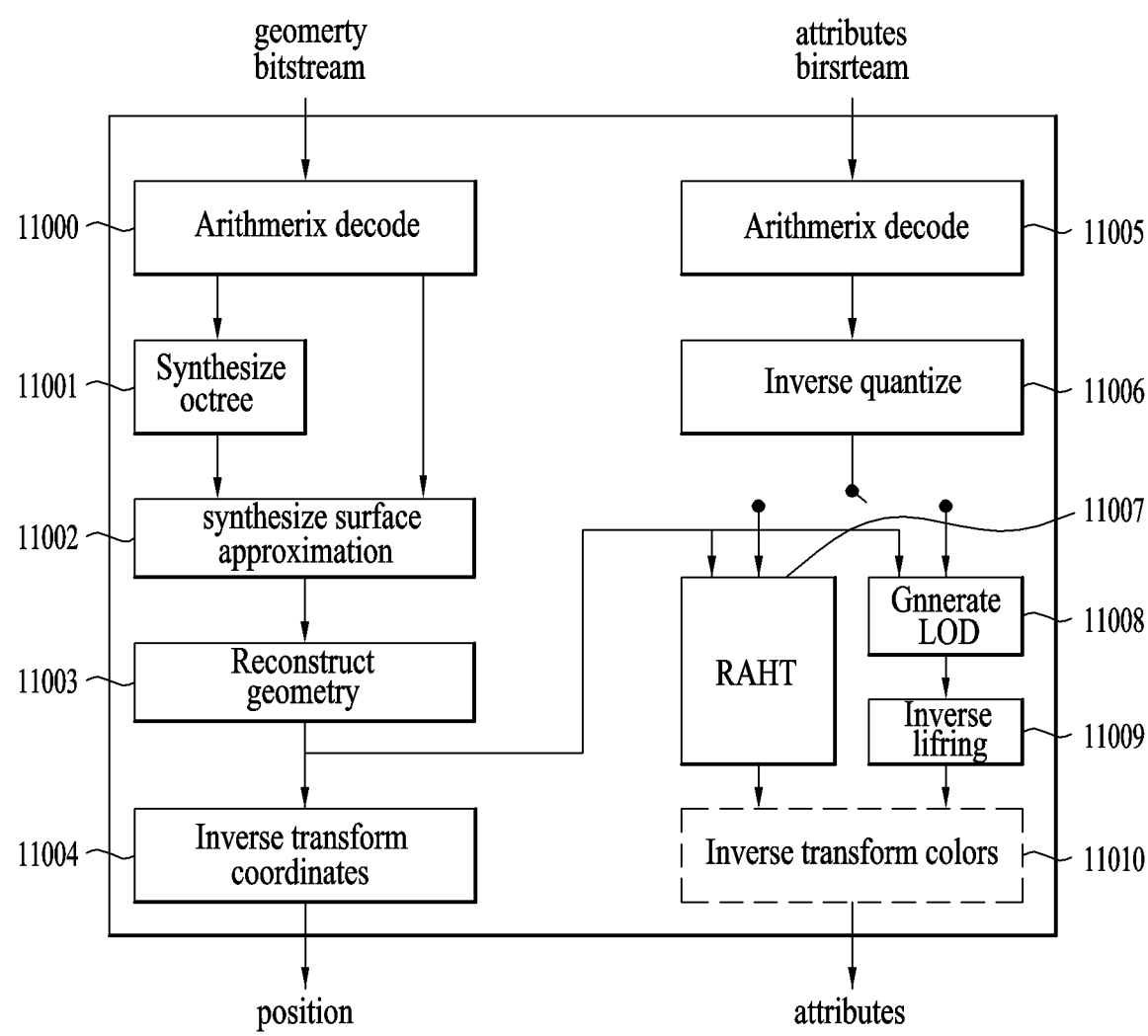
FIG. 11 illustrates a point cloud decoder according to embodiments.

FIG. 11 illustrates a point cloud decoder according to embodiments.

The point cloud decoder illustrated in FIG. 11 is an example of the point cloud decoder illustrated in FIG. 10, and may perform a decoding operation, which is an inverse process of the encoding operation of the point cloud encoder illustrated in FIGS. 1 to 9.

As described with reference to FIGS. 1 and 10, the point cloud decoder may perform geometry decoding and attribute decoding. The geometry decoding is performed before the attribute decoding.

The point cloud decoder according to the embodiments includes an arithmetic decoder (Arithmetic decode) 11000, an octree synthesizer (Synthesize octree) 11001, a surface approximation synthesizer (Synthesize surface approximation) 11002, and a geometry reconstructor (Reconstruct geometry) 11003, a coordinate inverse transformer (Inverse transform coordinates) 11004, an arithmetic decoder (Arithmetic decode) 11005, an inverse quantizer (Inverse quantize) 11006, a RAHT transformer 11007, an LOD generator (Generate LOD) 11008, an inverse lifter (inverse lifting) 11009, and/or a color inverse transformer (Inverse transform colors) 11010.

The arithmetic decoder 11000, the octree synthesizer 11001, the surface approximation synthesizer 11002, and the geometry reconstructor 11003, and the coordinate inverse transformer 11004 may perform geometry decoding. The geometry decoding according to the embodiments may include direct coding and trisoup geometry decoding. The direct coding and trisoup geometry decoding are selectively applied. The geometry decoding is not limited to the above-described example, and is performed as an inverse process of the geometry encoding described with reference to FIGS. 1 to 9.

The arithmetic decoder 11000 according to the embodiments decodes the received geometry bitstream based on the arithmetic coding. The operation of the arithmetic decoder 11000 corresponds to the inverse process of the arithmetic encoder 40004.

The octree synthesizer 11001 according to the embodiments may generate an octree by acquiring an occupancy code from the decoded geometry bitstream (or information on the geometry secured as a result of decoding). The occupancy code is configured as described in detail with reference to FIGS. 1 to 9.

When the trisoup geometry encoding is applied, the surface approximation synthesizer 11002 according to the embodiments may synthesize a surface based on the decoded geometry and/or the generated octree.

The geometry reconstructor 11003 according to the embodiments may regenerate geometry based on the surface and/or the decoded geometry. As described with reference to FIGS. 1 to 9, direct coding and trisoup geometry encoding are selectively applied. Accordingly, the geometry reconstructor 11003 directly imports and adds position information about the points to which direct coding is applied. When the trisoup geometry encoding is applied, the geometry reconstructor 11003 may reconstruct the geometry by performing the reconstruction operations of the geometry reconstructor 40005, for example, triangle reconstruction, up-sampling, and voxelization. Details are the same as those described with reference to FIG. 6, and thus description thereof is omitted. The reconstructed geometry may include a point cloud picture or frame that does not contain attributes.

The coordinate inverse transformer 11004 according to the embodiments may acquire positions of the points by transforming the coordinates based on the reconstructed geometry.

The arithmetic decoder 11005, the inverse quantizer 11006, the RAHT transformer 11007, the LOD generator 11008, the inverse lifter 11009, and/or the color inverse transformer 11010 may perform the attribute decoding described with reference to FIG. 10. The attribute decoding according to the embodiments includes region adaptive hierarchical transform (RAHT) decoding, interpolation-based hierarchical nearest-neighbor prediction (prediction transform) decoding, and interpolation-based hierarchical nearest-neighbor prediction with an update/lifting step (lifting transform) decoding. The three decoding schemes described above may be used selectively, or a combination of one or more decoding schemes may be used. The attribute decoding according to the embodiments is not limited to the above-described example.

The arithmetic decoder 11005 according to the embodiments decodes the attribute bitstream by arithmetic coding.

The inverse quantizer 11006 according to the embodiments inversely quantizes the information about the decoded attribute bitstream or attributes secured as a result of the decoding, and outputs the inversely quantized attributes (or attribute values). The inverse quantization may be selectively applied based on the attribute encoding of the point cloud encoder.

According to embodiments, the RAHT transformer 11007, the LOD generator 11008, and/or the inverse lifter 11009 may process the reconstructed geometry and the inversely quantized attributes. As described above, the RAHT transformer 11007, the LOD generator 11008, and/or the inverse lifter 11009 may selectively perform a decoding operation corresponding to the encoding of the point cloud encoder.

The color inverse transformer 11010 according to the embodiments performs inverse transform coding to inversely transform a color value (or texture) included in the decoded attributes. The operation of the color inverse transformer 11010 may be selectively performed based on the operation of the color transformer 40006 of the point cloud encoder.

Although not shown in the figure, the elements of the point cloud decoder of FIG. 11 may be implemented by hardware including one or more processors or integrated circuits configured to communicate with one or more memories included in the point cloud providing device, software, firmware, or a combination thereof. The one or more processors may perform at least one or more of the operations and/or functions of the elements of the point cloud decoder of FIG. 11 described above. Additionally, the one or more processors may operate or execute a set of software programs and/or instructions for performing the operations and/or functions of the elements of the point cloud decoder of FIG. 11.

Figure 12:
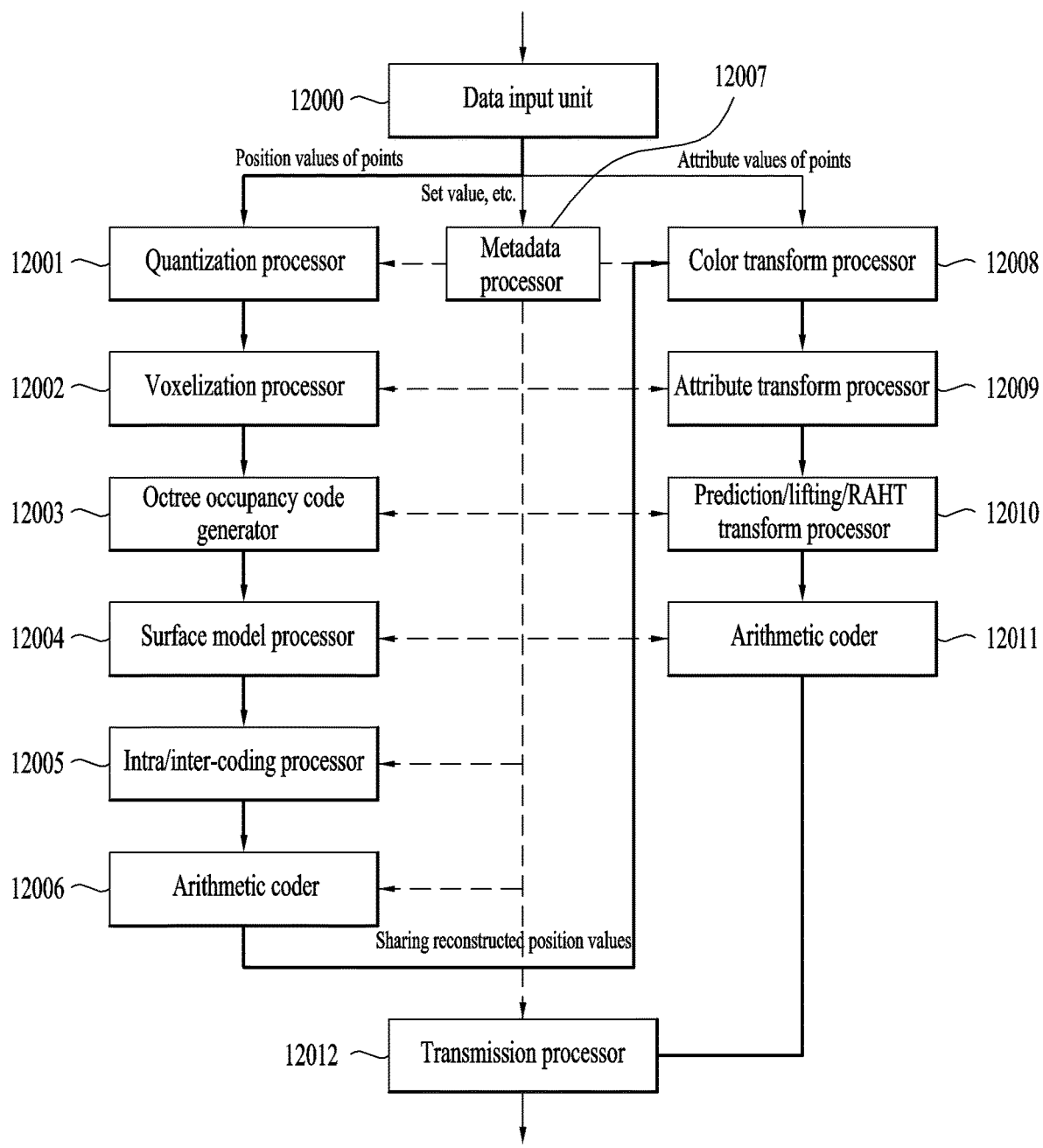
FIG. 12 illustrates a transmission device according to embodiments.

FIG. 12 illustrates a transmission device according to embodiments.

The transmission device shown in FIG. 12 is an example of the transmission device 10000 of FIG. 1 (or the point cloud encoder of FIG. 4). The transmission device illustrated in FIG. 12 may perform one or more of the operations and methods the same as or similar to those of the point cloud encoder described with reference to FIGS. 1 to 9. The transmission device according to the embodiments may include a data input unit 12000, a quantization processor 12001, a voxelization processor 12002, an octree occupancy code generator 12003, a surface model processor 12004, an intra/inter-coding processor 12005, an arithmetic coder 12006, a metadata processor 12007, a color transform processor 12008, an attribute transform processor 12009, a prediction/lifting/RAHT transform processor 12010, an arithmetic coder 12011 and/or a transmission processor 12012.

The data input unit 12000 according to the embodiments receives or acquires point cloud data. The data input unit 12000 may perform an operation and/or acquisition method the same as or similar to the operation and/or acquisition method of the point cloud video acquirer 10001 (or the acquisition process 20000 described with reference to FIG. 2).

The data input unit 12000, the quantization processor 12001, the voxelization processor 12002, the octree occupancy code generator 12003, the surface model processor 12004, the intra/inter-coding processor 12005, and the arithmetic coder 12006 perform geometry encoding. The geometry encoding according to the embodiments is the same as or similar to the geometry encoding described with reference to FIGS. 1 to 9, and thus a detailed description thereof is omitted.

The quantization processor 12001 according to the embodiments quantizes geometry (e.g., position values of points). The operation and/or quantization of the quantization processor 12001 is the same as or similar to the operation and/or quantization of the quantizer 40001 described with reference to FIG. 4. Details are the same as those described with reference to FIGS. 1 to 9.

The voxelization processor 12002 according to the embodiments voxelizes the quantized position values of the points. The voxelization processor 120002 may perform an operation and/or process the same or similar to the operation and/or the voxelization process of the quantizer 40001 described with reference to FIG. 4. Details are the same as those described with reference to FIGS. 1 to 9.

The octree occupancy code generator 12003 according to the embodiments performs octree coding on the voxelized positions of the points based on an octree structure. The octree occupancy code generator 12003 may generate an occupancy code. The octree occupancy code generator 12003 may perform an operation and/or method the same as or similar to the operation and/or method of the point cloud encoder (or the octree analyzer 40002) described with reference to FIGS. 4 and 6. Details are the same as those described with reference to FIGS. 1 to 9.

The surface model processor 12004 according to the embodiments may perform trigsoup geometry encoding based on a surface model to reconstruct the positions of points in a specific region (or node) on a voxel basis. The surface model processor 12004 may perform an operation and/or method the same as or similar to the operation and/or method of the point cloud encoder (for example, the surface approximation analyzer 40003) described with reference to FIG. 4. Details are the same as those described with reference to FIGS. 1 to 9.

The intra/inter-coding processor 12005 according to the embodiments may perform intra/inter-coding on point cloud data. The intra/inter-coding processor 12005 may perform coding the same as or similar to the intra/inter-coding described with reference to FIG. 7. Details are the same as those described with reference to FIG. 7. According to embodiments, the intra/inter-coding processor 12005 may be included in the arithmetic coder 12006.

The arithmetic coder 12006 according to the embodiments performs entropy encoding on an octree of the point cloud data and/or an approximated octree. For example, the encoding scheme includes arithmetic encoding. The arithmetic coder 12006 performs an operation and/or method the same as or similar to the operation and/or method of the arithmetic encoder 40004.

The metadata processor 12007 according to the embodiments processes metadata about the point cloud data, for example, a set value, and provides the same to a necessary processing process such as geometry encoding and/or attribute encoding. Also, the metadata processor 12007 according to the embodiments may generate and/or process signaling information related to the geometry encoding and/or the attribute encoding. The signaling information according to the embodiments may be encoded separately from the geometry encoding and/or the attribute encoding. The signaling information according to the embodiments may be interleaved.

The color transform processor 12008, the attribute transform processor 12009, the prediction/lifting/RAHT transform processor 12010, and the arithmetic coder 12011 perform the attribute encoding. The attribute encoding according to the embodiments is the same as or similar to the attribute encoding described with reference to FIGS. 1 to 9, and thus a detailed description thereof is omitted.

The color transform processor 12008 according to the embodiments performs color transform coding to transform color values included in attributes. The color transform processor 12008 may perform color transform coding based on the reconstructed geometry. The reconstructed geometry is the same as described with reference to FIGS. 1 to 9. Also, it performs an operation and/or method the same as or similar to the operation and/or method of the color transformer 40006 described with reference to FIG. 4 is performed. The detailed description thereof is omitted.

The attribute transform processor 12009 according to the embodiments performs attribute transformation to transform the attributes based on the reconstructed geometry and/or the positions on which geometry encoding is not performed. The attribute transform processor 12009 performs an operation and/or method the same as or similar to the operation and/or method of the attribute transformer 40007 described with reference to FIG. 4. The detailed description thereof is omitted. The prediction/lifting/RAHT transform processor 12010 according to the embodiments may code the transformed attributes by any one or a combination of RAHT coding, prediction transform coding, and lifting transform coding. The prediction/lifting/RAHT transform processor 12010 performs at least one of the operations the same as or similar to the operations of the RAHT transformer 40008, the LOD generator 40009, and the lifting transformer 40010 described with reference to FIG. 4. In addition, the prediction transform coding, the lifting transform coding, and the RAHT transform coding are the same as those described with reference to FIGS. 1 to 9, and thus a detailed description thereof is omitted.

The arithmetic coder 12011 according to the embodiments may encode the coded attributes based on the arithmetic coding. The arithmetic coder 12011 performs an operation and/or method the same as or similar to the operation and/or method of the arithmetic encoder 400012.

The transmission processor 12012 according to the embodiments may transmit each bitstream containing encoded geometry and/or encoded attributes and metadata information, or transmit one bitstream configured with the encoded geometry and/or the encoded attributes and the metadata information. When the encoded geometry and/or the encoded attributes and the metadata information according to the embodiments are configured into one bitstream, the bitstream may include one or more sub-bitstreams. The bitstream according to the embodiments may contain signaling information including a sequence parameter set (SPS) for signaling of a sequence level, a geometry parameter set (GPS) for signaling of geometry information coding, an attribute parameter set (APS) for signaling of attribute information coding, and a tile parameter set (TPS) for signaling of a tile level, and slice data. The slice data may include information about one or more slices. One slice according to embodiments may include one geometry bitstream Geom0$^0$ and one or more attribute bitstreams Attr0$^0$ and Attr1$^0$.

A slice refers to a series of syntax elements representing the entirety or part of a coded point cloud frame.

The TPS according to the embodiments may include information about each tile (for example, coordinate information and height/size information about a bounding box) for one or more tiles. The geometry bitstream may contain a header and a payload. The header of the geometry bitstream according to the embodiments may contain a parameter set identifier (geom_parameter_set_id), a tile identifier (geom_tile_id) and a slice identifier (geom_slice_id) included in the GPS, and information about the data contained in the payload. As described above, the metadata processor 12007 according to the embodiments may generate and/or process the signaling information and transmit the same to the transmission processor 12012. According to embodiments, the elements to perform geometry encoding and the elements to perform attribute encoding may share data/information with each other as indicated by dotted lines. The transmission processor 12012 according to the embodiments may perform an operation and/or transmission method the same as or similar to the operation and/or transmission method of the transmitter 10003. Details are the same as those described with reference to FIGS. 1 and 2, and thus a description thereof is omitted.

Figure 13:
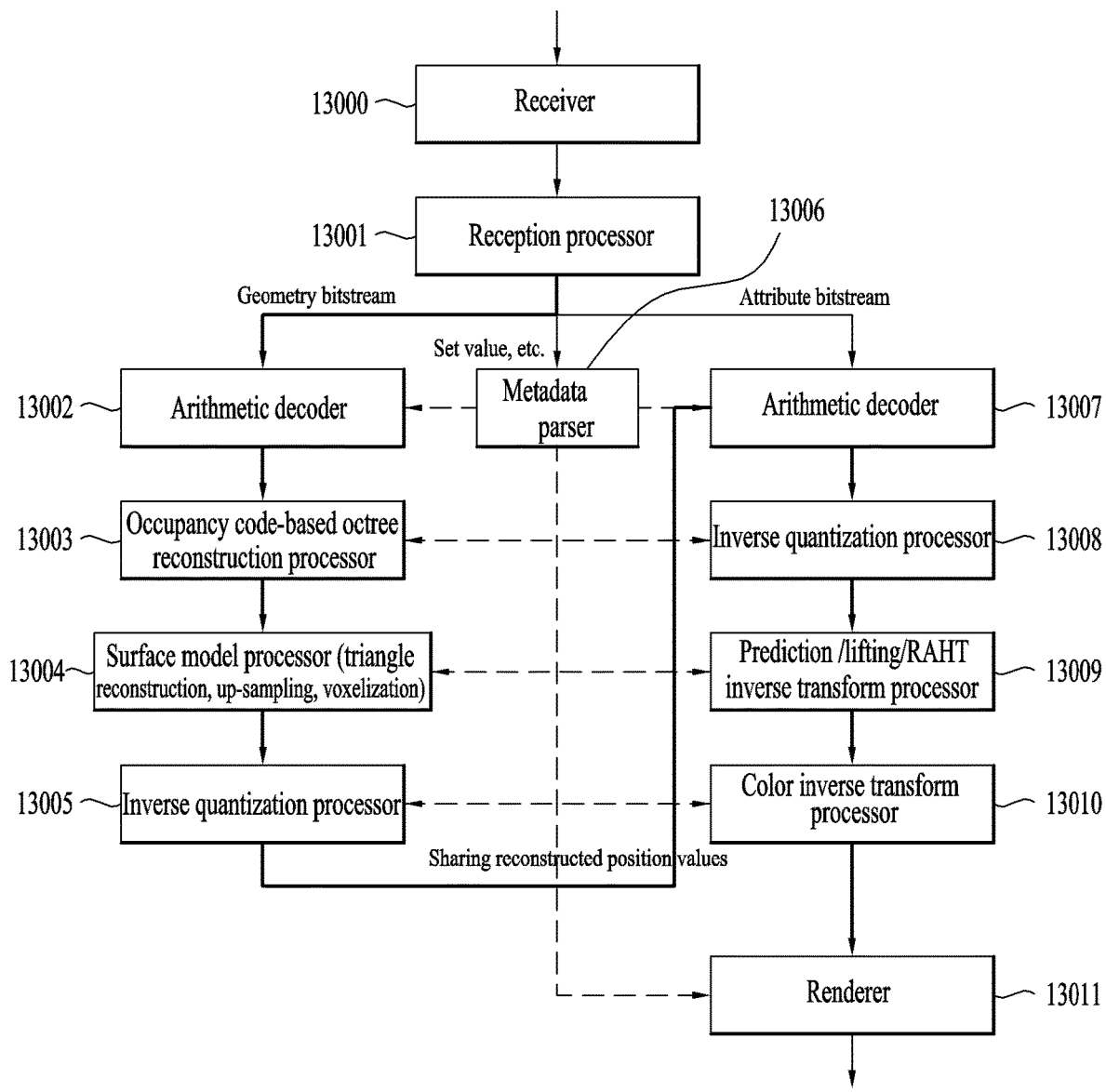
FIG. 13 illustrates a reception device according to embodiments.

FIG. 13 illustrates a reception device according to embodiments.

The reception device illustrated in FIG. 13 is an example of the reception device 10004 of FIG. 1 (or the point cloud decoder of FIGS. 10 and 11). The reception device illustrated in FIG. 13 may perform one or more of the operations and methods the same as or similar to those of the point cloud decoder described with reference to FIGS. 1 to 11.

The reception device according to the embodiment includes a receiver 13000, a reception processor 13001, an arithmetic decoder 13002, an occupancy code-based octree reconstruction processor 13003, a surface model processor (triangle reconstruction, up-sampling, voxelization) 13004, an inverse quantization processor 13005, a metadata parser 13006, an arithmetic decoder 13007, an inverse quantization processor 13008, a prediction/lifting/RAHT inverse transform processor 13009, a color inverse transform processor 13010, and/or a renderer 13011. Each element for decoding according to the embodiments may perform an inverse process of the operation of a corresponding element for encoding according to the embodiments.

The receiver 13000 according to the embodiments receives point cloud data. The receiver 13000 may perform an operation and/or reception method the same as or similar to the operation and/or reception method of the receiver 10005 of FIG. 1. The detailed description thereof is omitted.

The reception processor 13001 according to the embodiments may acquire a geometry bitstream and/or an attribute bitstream from the received data. The reception processor 13001 may be included in the receiver 13000.

The arithmetic decoder 13002, the occupancy code-based octree reconstruction processor 13003, the surface model processor 13004, and the inverse quantization processor 1305 may perform geometry decoding. The geometry decoding according to embodiments is the same as or similar to the geometry decoding described with reference to FIGS. 1 to 10, and thus a detailed description thereof is omitted.

The arithmetic decoder 13002 according to the embodiments may decode the geometry bitstream based on arithmetic coding. The arithmetic decoder 13002 performs an operation and/or coding the same as or similar to the operation and/or coding of the arithmetic decoder 11000.

The occupancy code-based octree reconstruction processor 13003 according to the embodiments may reconstruct an octree by acquiring an occupancy code from the decoded geometry bitstream (or information about the geometry secured as a result of decoding). The occupancy code-based octree reconstruction processor 13003 performs an operation and/or method the same as or similar to the operation and/or octree generation method of the octree synthesizer 11001. When the trisoup geometry encoding is applied, the surface model processor 1302 according to the embodiments may perform trisoup geometry decoding and related geometry reconstruction (for example, triangle reconstruction, up-sampling, voxelization) based on the surface model method. The surface model processor 1302 performs an operation the same as or similar to that of the surface approximation synthesizer 11002 and/or the geometry reconstructor 11003.

The inverse quantization processor 1305 according to the embodiments may inversely quantize the decoded geometry.

The metadata parser 1306 according to the embodiments may parse metadata contained in the received point cloud data, for example, a set value. The metadata parser 1306 may pass the metadata to geometry decoding and/or attribute decoding. The metadata is the same as that described with reference to FIG. 12, and thus a detailed description thereof is omitted.

The arithmetic decoder 13007, the inverse quantization processor 13008, the prediction/lifting/RAHT inverse transform processor 13009 and the color inverse transform processor 13010 perform attribute decoding. The attribute decoding is the same as or similar to the attribute decoding described with reference to FIGS. 1 to 10, and thus a detailed description thereof is omitted.

The arithmetic decoder 13007 according to the embodiments may decode the attribute bitstream by arithmetic coding. The arithmetic decoder 13007 may decode the attribute bitstream based on the reconstructed geometry. The arithmetic decoder 13007 performs an operation and/or coding the same as or similar to the operation and/or coding of the arithmetic decoder 11005.

The inverse quantization processor 13008 according to the embodiments may inversely quantize the decoded attribute bitstream. The inverse quantization processor 13008 performs an operation and/or method the same as or similar to the operation and/or inverse quantization method of the inverse quantizer 11006.

The prediction/lifting/RAHT inverse transformer 13009 according to the embodiments may process the reconstructed geometry and the inversely quantized attributes. The prediction/lifting/RAHT inverse transform processor 1301 performs one or more of operations and/or decoding the same as or similar to the operations and/or decoding of the RAHT transformer 11007, the LOD generator 11008, and/or the inverse lifter 11009. The color inverse transform processor 13010 according to the embodiments performs inverse transform coding to inversely transform color values (or textures) included in the decoded attributes. The color inverse transform processor 13010 performs an operation and/or inverse transform coding the same as or similar to the operation and/or inverse transform coding of the color inverse transformer 11010. The renderer 13011 according to the embodiments may render the point cloud data.

Figure 14:
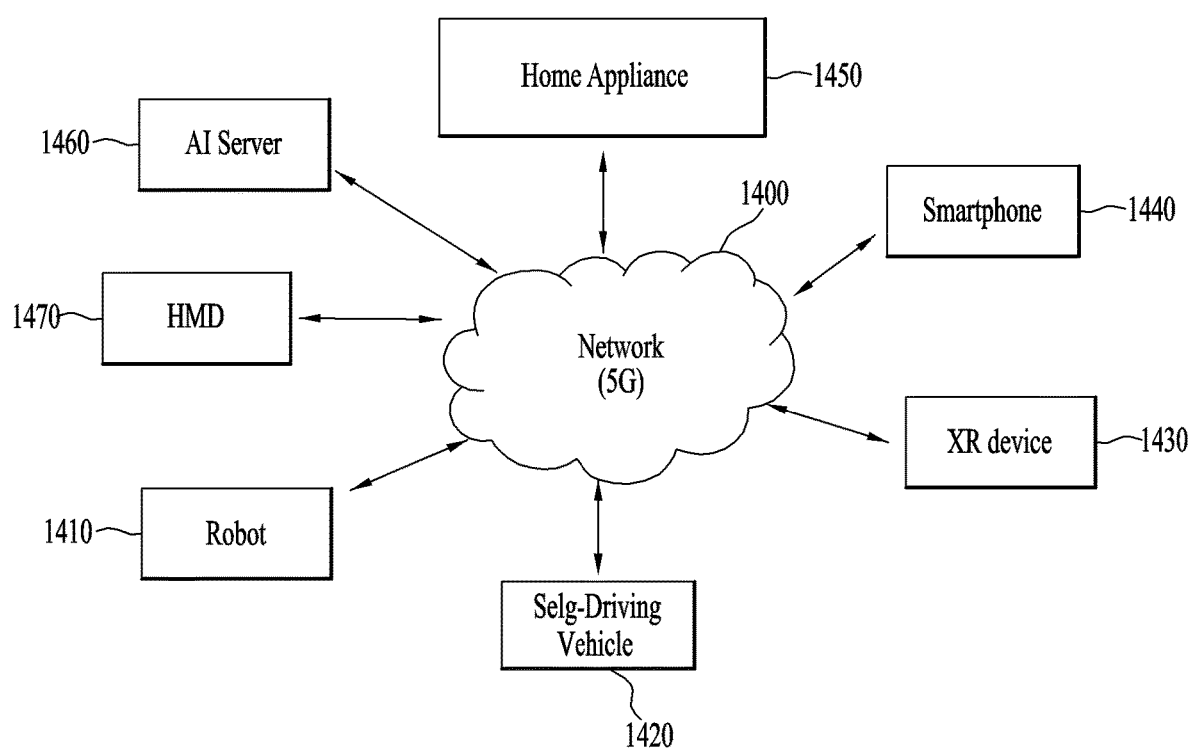
FIG. 14 illustrates an exemplary structure operable in connection with point cloud data transmission/reception methods/devices according to embodiments.

FIG. 14 illustrates an exemplary structure operable in connection with point cloud data transmission/reception methods/devices according to embodiments.

The structure of FIG. 14 represents a configuration in which at least one of a server 1460, a robot 1410, a self-driving vehicle 1420, an XR device 1430, a smartphone 1440, a home appliance 1450, and/or a head-mount display (HMD) 1470 is connected to the cloud network 1400. The robot 1410, the self-driving vehicle 1420, the XR device 1430, the smartphone 1440, or the home appliance 1450 is called a device. Further, the XR device 1430 may correspond to a point cloud data (PCC) device according to embodiments or may be operatively connected to the PCC device.

The cloud network 1400 may represent a network that constitutes part of the cloud computing infrastructure or is present in the cloud computing infrastructure. Here, the cloud network 1400 may be configured using a 3G network, 4G or Long Term Evolution (LTE) network, or a 5G network.

The server 1460 may be connected to at least one of the robot 1410, the self-driving vehicle 1420, the XR device 1430, the smartphone 1440, the home appliance 1450, and/or the HMD 1470 over the cloud network 1400 and may assist in at least a part of the processing of the connected devices 1410 to 1470.

The HMD 1470 represents one of the implementation types of the XR device and/or the PCC device according to the embodiments. The HMD type device according to the embodiments includes a communication unit, a control unit, a memory, an I/O unit, a sensor unit, and a power supply unit.

Hereinafter, various embodiments of the devices 1410 to 1450 to which the above-described technology is applied will be described. The devices 1410 to 1450 illustrated in FIG. 14 may be operatively connected/coupled to a point cloud data transmission device and reception according to the above-described embodiments.

PCC+XR

The XR/PCC device 1430 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 1430 may analyze 3D point cloud data or image data acquired through various sensors or from an external device and generate position data and attribute data about 3D points. Thereby, the XR/PCC device 1430 may acquire information about the surrounding space or a real object, and render and output an XR object. For example, the XR/PCC device 1430 may match an XR object including auxiliary information about a recognized object with the recognized object and output the matched XR object.

PCC+XR+Mobile Phone

The XR/PCC device 1430 may be implemented as a mobile phone 1440 by applying PCC technology.

The mobile phone 1440 may decode and display point cloud content based on the PCC technology.

PCC+Self-Driving+XR

The self-driving vehicle 1420 may be implemented as a mobile robot, a vehicle, an unmanned aerial vehicle, or the like by applying the PCC technology and the XR technology.

The self-driving vehicle 1420 to which the XR/PCC technology is applied may represent a self-driving vehicle provided with means for providing an XR image, or a self-driving vehicle that is a target of control/interaction in the XR image. In particular, the self-driving vehicle 1420 which is a target of control/interaction in the XR image may be distinguished from the XR device 1430 and may be operatively connected thereto.

The self-driving vehicle 1420 having means for providing an XR/PCC image may acquire sensor information from sensors including a camera, and output the generated XR/PCC image based on the acquired sensor information. For example, the self-driving vehicle 1420 may have an HUD and output an XR/PCC image thereto, thereby providing an occupant with an XR/PCC object corresponding to a real object or an object present on the screen.

When the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap an object on the screen. For example, the self-driving vehicle 1220 may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only CG images of real-world objects, backgrounds, and the like. On the other hand, the AR technology refers to a technology that shows a virtually created CG image on the image of a real object. The MR technology is similar to the AR technology described above in that virtual objects to be shown are mixed and combined with the real world. However, the MR technology differs from the AR technology in that the AR technology makes a clear distinction between a real object and a virtual object created as a CG image and uses virtual objects as complementary objects for real objects, whereas the MR technology treats virtual objects as objects having equivalent characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to any of the VR, AR, MR, and XR technologies. The encoding/decoding based on PCC, V-PCC, and G-PCC techniques is applicable to such technologies.

The PCC method/device according to the embodiments may be applied to a vehicle that provides a self-driving service.

A vehicle that provides the self-driving service is connected to a PCC device for wired/wireless communication.

When the point cloud data (PCC) transmission/reception device according to the embodiments is connected to a vehicle for wired/wireless communication, the device may receive/process content data related to an AR/VR/PCC service, which may be provided together with the self-driving service, and transmit the same to the vehicle. In the case where the PCC transmission/reception device is mounted on a vehicle, the PCC transmission/reception device may receive/process content data related to the AR/VR/PCC service according to a user input signal input through a user interface device and provide the same to the user. The vehicle or the user interface device according to the embodiments may receive a user input signal. The user input signal according to the embodiments may include a signal indicating the self-driving service.

A method/device for transmitting point cloud data according to embodiments is constructed as a term referring to the transmission device 10000 of FIG. 1, the point cloud video encoder 10002 of FIG. 1, the transmitter 10003 of FIG. 1, and the acquisition 20000/encoding 20001/transmission 20002 of FIG. 2, the encoder of FIG. 4, the transmission device of FIG. 12, the device of FIG. 14, the encoding process of FIGS. 20 and 22, and the like.

Figure 23:
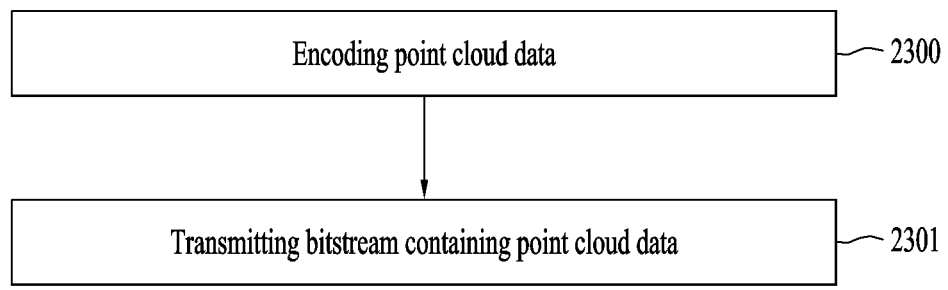
FIG. 23 illustrates a method of transmitting point cloud data according to embodiments.

A method/device for receiving point cloud data according to embodiments is constructed as a term referring to the reception device 10004 of FIG. 1, the receiver 10005 of FIG. 1, the point cloud video decoder 10006 of FIG. 1, the transmission 20002/decoding 20003/rendering 20004 of FIG. 2, the decoder of FIGS. 10 and 11, the reception device of FIG. 13, the device of FIG. 14, the decoding process of FIGS. 21 and 23, and the like.

In addition, the method/device for transmitting and receiving point cloud data according to the embodiments may be simply referred to as a method/device according to the embodiments.

According to embodiments, geometry data, geometry information, position information, and the like constituting the point cloud data are construed as having the same meaning. Attribute data, attribute information, attribute information, and the like constituting the point cloud data are construed as having the same meaning.

Figure 15:
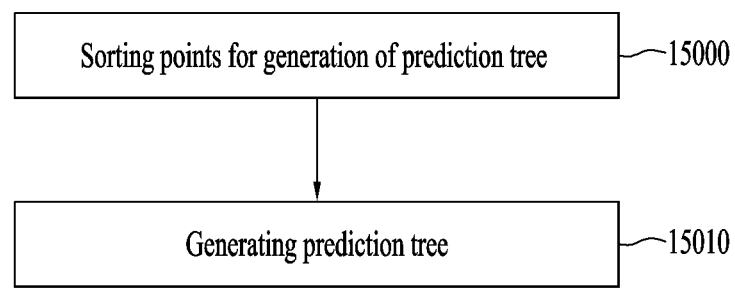
FIG. 15 illustrates a method of transmitting point cloud data according to embodiments.

FIG. 15 illustrates a method of transmitting point cloud data according to embodiments.

Figure 16:
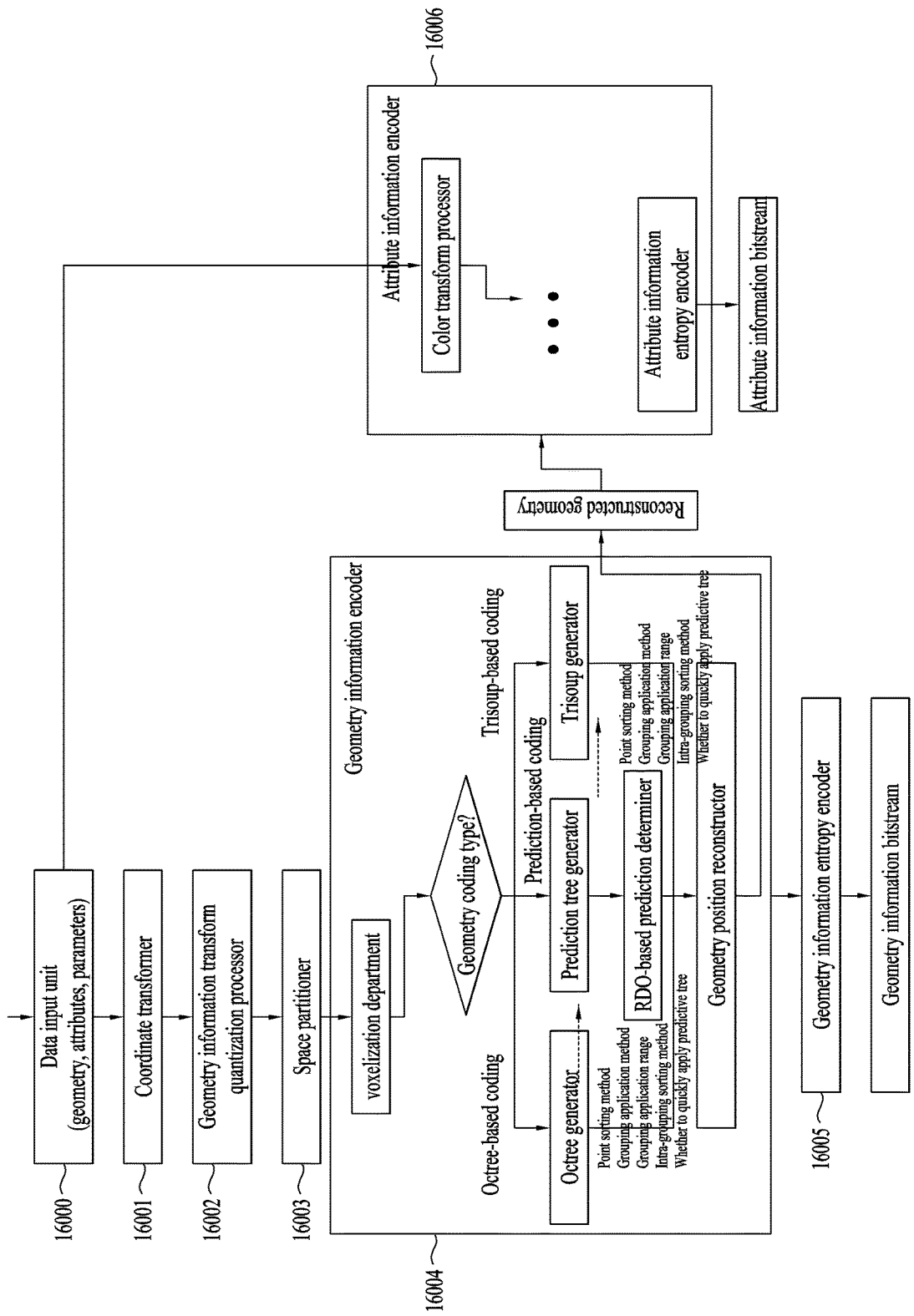
FIG. 16 illustrates a point cloud data transmission device according to embodiments.

The transmission device 10000 of FIG. 1, the point cloud video encoder 10002, the encoding of FIG. 2, the encoder of FIG. 4, the transmission device of FIG. 12, the device of FIG. 14, the point cloud data transmission device of FIG. 16, etc. may compress (encode) point cloud data based on the method illustrated in FIG. 15. The reception device 10004 of FIG. 1, the point cloud video decoder 10006 of FIG. 1, the decoding of FIG. 2, the decoder of FIGS. 10 and 11, the reception device of FIG. 13, the device of FIG. 14, the point cloud data reception device of FIG. 17, etc. may decode point cloud data based on the method illustrated in FIG. 15.

The method/device according to the embodiments may compress/reconstruct point cloud geometry information with low latency. To ensure efficient processing in this operation, a predictive tree may be used. In generating a predictive tree, points may be sorted based on grouping and a predictive tree may be quickly generated based on the sorting order.

There may be a scenario in which low-latency coding is required for point cloud content. For example, a case where point cloud data should be captured and transmitted from LiDAR in real time, or a case where 3D map data should be received and processed in real time may correspond to the aforementioned scenario.

Thus, the method/device according to the embodiments relate to a grouping-based point sorting method for enhancing compression/reconstruction efficiency of predictive tree-based geometry information coding that may be applied in geometry compression/reconstruction of geometry-based point cloud compression (G-PCC) of cloud content for which low-latency coding is required, and a method for quickly generating a predictive tree based on the sorting order.

For example, the embodiments may provide a point sorting method, a method for quickly generating a predictive tree based on the sorting order, and a signaling method for supporting the above methods in generating a predictive tree to reduce the bitstream size.

Embodiments relate to a method of selecting an attribute predictor for increasing attribute compression efficiency of G-PCC for 3D point cloud data compression. Hereinafter, an encoder and an encoding device are referred to as an encoder, and a decoder and a decoding device are referred to as a decoder.

A point cloud is composed of a set of points, and each of the points may include geometry information and attribute information. The geometry information is three-dimensional position (XYZ) information, and the attribute information is values of a color (RGB, YUV, etc.) and/or reflectance. The G-PCC encoding operation may include compressing geometry and compressing attribute information based on the geometry reconstructed by reconstructing position information changed through the compression (reconstructed geometry=decoded geometry) (see FIGS. 4, 12, and 16).

The G-PCC decoding operation, which corresponds to the G-PCC encoding operation, may include receiving an encoded geometry bitstream and attribute bitstream (see FIGS. 18 to 22), decoding geometry, and decoding attribute information based on the geometry reconstructed through the decoding operation (see FIGS. 10, 11, 13 and 17).

For geometry information compression, an octree-based, trisoup-based, or predictive tree-based compression technique may be used.

A typical example of a point cloud service requiring low latency may include real-time navigation using a 3D map point cloud, or real-time capture, compression, and transmission of a point cloud through a LiDAR device.

As a main function of improving the method of the encoder and decoder for low-latency services, a function to start compressing part of the point cloud data first may be needed. In the octree-based geometry coding, points are scanned and coded in a breadth-first manner. On the other hand, in the predictive tree-based geometry compression, which targets low-latency geometry compression, the same operation may be performed in a depth-first manner in order to reduce step-by-step point scanning as much as possible, a predicted value may be generated through geometry information between parent and child nodes on the tree, and the residual may be entropy-coded to configure a geometry bitstream. Since the depth-first scheme does not require step-by-step scanning of all points, geometric coding may be progressively performed on the captured point cloud data without waiting for all data to be captured.

However, since the operation is performed in the depth-first manner, the depth-first scheme may have a larger residual than the octree-based geometry coding, in which the whole points are analyzed and efficiently encoded, and accordingly may increase the size of the geometry bitstream.

In the predictive tree-based compression, the points are sorted and tree generation is sequentially performed based on the sorted points. Accordingly, the order of the points may have a close influence on the tree generation. That is, for nodes in the predictive tree, points close to each other may not be set as a parent/child node. Instead, a point in an adjacent position in order of a point array is very likely to be set as a parent/child node.

The method/device according to the embodiments has an effect of reducing the size of a geometry bitstream by changing the method of sorting points.

When a predictive tree is generated based on the KD tree, it may take a long time to search for points that are close in distance to each other. This feature may be an obstruction to the low-latency real-time service. The method/device according to the embodiments may reduce the time required to generate a predictive tree.

The predictive tree-based geometry compression according to the embodiments may be performed by the PCC geometry encoder of the PCC encoder and the geometry may be reconstructed through the PCC geometry decoding in the PCC decoder.

1500: The method of transmitting point cloud data according to the embodiments may include sorting points for generation of a predictive tree.

Sorting Points for Generation of a Prediction Tree

The method/device according to the embodiments may sort the points in a specific manner for efficient generation of a predictive tree.

Before generating the predictive tree, the points (Points [*]) are sequentially sorted base on Morton code, radius, azimuth, elevation, sensor ID, or by sequentially applying a captured time. The sorting method may be applied in various ways according to the characteristics of the content.

Sorting may be applied differently according to several divided stages. For example, content that takes the form of spinning data captured by LiDAR equipment, points (geometric data of the point cloud data) may be sorted based on an azimuth suitable for the content. Then, points having the same azimuth may be sorted based on the radius. Then, points having the same radius may be sorted based on the elevation.

According to embodiments, the direction of sorting may be specified. Sorting may be performed in ascending order, descending order, or both. For example, azimuth may be applied in descending order and radius may be applied in ascending order.

The method/device according to the embodiments may apply grouping in sorting points.

Grouping is a method of sorting groups by specifying a specific range and performing sorting within the specified range.

For example, when points are grouped based on azimuth, points in a specific range of azimuth may be included in one group, and points in the group may be grouped by radius, and points having the same radius may be sorted by elevation.

There may be various grouping criteria according to embodiments, like sorting criteria. Grouping may be applied based on Morton code, radius, azimuth, elevation, sensor ID, captured time, or the like, and a range of values may be defined for grouping.

For example, when Morton code is used, x, y, and z values may be shifted to perform grouping. When the azimuth is used, a decimal point of a radian value may be rounded off. For the elevation, radius, sensor ID, or capture time, a range may be set.

After grouping, sorting may be further performed in the group for the n-th time.

When a predictive tree is generated by sorting points by similar characteristics in distribution based on the fact that points in a specific range may have similar characteristics in distribution, the residual may be reduced due to a similar pattern, thereby reducing the size of a bitstream.

1501: The method of transmitting point cloud data according to the embodiments may further include generating a predictive tree.

The method for generation of a predictive tree according to the embodiments may include using a KD tree and grouping-based predictive tree generation.

1. Using a KD Tree

In the predictive tree-based geometry information compression coding, the operation of generating a tree based on a sorting order for generation of the predictive tree may be configure as the following pseudo-code.

Points[ ]: Array of all points;
pointCount: Total number of points;
second_sorted_idexes[ ]: Array of indexes of the final sorted points;
KDTree: KD-Tree used for neighbor node search.
for (i=0; I<pointCount; i++) {
1) P=Points[second_sorted_idexes[i]]
2) Search the KD tree for a neighbor close to P
3) If there is no close neighbor as a search result, register P as a node in the KD tree
When there is no node in the KD tree at first, P may be registered in the KD tree.
4) If there is a node as a search result, check how the number of children of the original node connected to the corresponding node of the KD tree. If the number is less than or equal to 3 (or is less than 3), register the children of the original node. If the number is greater than or equal to 3, check the next nearest node. If the number of the checked nodes is less than or equal to 3, register the checked nodes.
The number of child nodes may be set differently according to embodiments.
5) Register the predicted results of P (3, excluding itself) as nodes of the KD tree.
}

A predictive tree having a neighbor most similar to the current point as a child node may be generated from the sorted points. The predictive tree may represent a parent-child relationship for each point (node), and a predicted value of the point may be generated from the predictive tree.

The predicted results of P may be obtained from a predicted result from the parent node, a predicted result from the grand parent and the parent, and a predicted result from the grand grand parent, the grand parent and the parent. A predicted value may be efficiently obtained from the predictive tree including parent/child nodes generated by searching for near neighbors.

2. Grouping-Based Predictive Tree

According to embodiments, in order to quickly generate a predictive tree, a predictive tree may be quickly constructed by configuring points in a group in a parent-child relationship according to a sorting order without a KD tree, and configuring the nearest point between consecutive groups in a parent-child relationship. This operation may be configured by the following pseudo-code.

idx=0
group_sorted_indxes[ ][ ]: Indexes of points belonging to a group
for (i=0; I<groupCount; i++) {
for (j=0; j<groupCount[i].size( ); j++) {
1) P=Points[group sorted indexes[i][j]]
The generation of a predictive tree for points included in a group is started for the number of groups.
For example, the generation may start from the j-th point of the i-th group.
2) If j !=0, set Points[group_sorted_indexes[i][j−1]] as the parent of P
By setting the point corresponding to j−1, which is the previous value of j, as the parent of P, the parent-child relationship may be established quickly.
3) If j=0 and i !=0, then
(1) Find a point close to P in group_sorted_indexes[i−1] (based on, for example, difference in radius, x/y/z distance, etc.) and set the point as the parent of P.
Since the parent for the i-th group is searched in the (i−1)-th group that has been previously processed, the parent-child relationship may be established quickly.
}
}

Each operation according to the embodiments may be performed by the point cloud data transmission/reception device that may be implemented by hardware including one or more processors or integrated circuits configured to communicate with one or more memories, software, firmware, or a combination thereof according to the embodiments.

FIG. 16 illustrates a point cloud data transmission device according to embodiments.

The transmission device 10000 of FIG. 1, the point cloud video encoder 10002 of FIG. 1, the encoding of FIG. 2, the encoder of FIG. 4, the transmission device of FIG. 12, the device of FIG. 14, the point cloud data transmission device of FIG. 16, or the like may include a structure as shown in FIG. 16. Each element may correspond to the point cloud data transmission device that may be implemented by hardware including one or more processors or integrated circuits configured to communicate with one or more memories, software, firmware, or a combination thereof according to the embodiments.

The data input unit 16000 may receive point cloud data. The data input unit may receive geometry data of the point cloud data, attribute data, and/or parameter information set for the point cloud data.

The coordinate transformer 16001 may transform coordinate information about the point cloud data to enable encoding.

The geometry information transform quantization processor 16002 may quantize the geometry data. For example, quantization may be applied to the geometry data based on a quantization parameter.

The space partitioner 16003 may partition the geometry data based on a spatial unit in order to encode the geometry data.

The geometry information encoder 16004 may encode the geometry data. The geometry information encoder may voxelize the geometry data. According to embodiments, the voxelization may be optional. That is, when a predictive tree for geometry coding is executed, the geometry data may or may not be voxelized.

When the geometry coding type is prediction-based coding, the geometry information encoder may generate a predictive tree through a predictive tree generator, generate a predictive tree through a prediction determiner, and perform rate distortion optimization (RDO) to select an optimal prediction mode. A predicted geometry value according to the optimal prediction mode may be generated.

The geometry information entropy encoder may entropy-code a residual with respect to the predicted value and configure a geometry information bitstream.

The predictive tree generator may generate a predictive tree based the settings according to a point sorting method (e.g., No sorting, sorting in a Morton code order, sorting in a radius order, sorting in an azimuth order, sorting in an elevation order, sorting in a sensor ID order, sorting in a captured time order, etc.), a grouping application method (e.g., No sorting, sorting in a Morton code order, sorting in a radius order, sorting in an azimuth order, sorting in an elevation order, sorting in a sensor ID order, sorting in a captured time order, combinations thereof, etc.), grouping range (e.g., when a shift value, radius, azimuth, elevation, or captured time is a decimal value, Morton code grouping is applied to rounding digits, values indicating the other range, etc.), a sorting method within grouping (e.g., No sorting, sorting in a Morton code order, sorting in a radius order, sorting in an azimuth order, sorting in an elevation order, sorting in a sensor ID order, sorting in a captured time order, etc.), quick application of a predictive tree (generation of a predictive tree based on the parent-child relationship in a group, generation of a predictive tree based on the parent-child relationship between adjacent groups).

The predictive tree generator may generate information on the point sorting method (pred_geom_tree_sorting_type), the grouping application method (pred_geom_tree_sorting_type), the grouping range (pred_geom_tree_grouping_n_digit), the sorting method within the grouping (pred_geom_tree_sorting_type), and quick application of the predictive tree (pred_geom_tree_build_method), and transmit the same to the receiving side.

The predictive tree generator may receive an input of the point sorting method according to the setting of the transmission device, and may sort the points according to the sorting method. The point sorting method may include sorting in a Morton code order, sorting in a radius order, sorting in an azimuth order, sorting in an elevation order, sorting in a sensor ID order, sorting in a captured time order, or a combination thereof. The applied sorting method may be included in the bitstream as parameter information and delivered to the decoder. The sorting operation may be divided into multiple operations, and the sorting may be applied differently in each operation. A plurality of point cloud data may be sorted differently in the respective operations.

The predictive tree generator may receive an input of whether to apply grouping to the point sorting method and a method for grouping according to the setting of the transmission device. The grouping sorting method may include sorting in a Morton code order, sorting in a radius order, sorting in an azimuth order, sorting in an elevation order, sorting in a sensor ID order, sorting in a captured time order, or a combination thereof. The applied grouping sorting method may be included in the bitstream as parameter information and delivered to the decoder. The sorting operation may be divided into multiple operations, and the grouping may be applied in each operation. A plurality of point cloud data may be grouped differently in the respective operations.

The predictive tree generator may receive an input of grouping range according to the setting of the transmission device.

For example, in the Morton code grouping, a shift value may be a grouping range setting value. When the Morton code for a plurality of points is expressed in bits, the Morton code may be shifted by a shift value indicating the grouping range such that the plurality of points may be grouped (or sorted) into the same group.

When the azimuth, elevation, time, or the like has a value with a decimal point, a digit number to be rounded off may be a grouping range setting value. When a plurality of points is expressed as data having a decimal point, such as azimuth, the plurality of points may be grouped or sorted into the same group by rounding the data at a specific decimal place.

In the case of sensor ID or other data, a range value may be a grouping range setting value. Points included within a certain range may be grouped or sorted into the same group.

The grouping range according to the embodiments may be included in the bitstream as parameter information and delivered to the decoder.

The predictive tree generator may receive an input of a method for sorting points in a group according to the setting of the transmission device. Points belonging to the group may be sorted according to the sorting method within the group. The point sorting method may include sorting in a Morton code order, sorting in a radius order, sorting in an azimuth order, sorting in an elevation order, sorting in a sensor ID order, sorting in a captured time order, or a combination thereof. The applied sorting method may be included in the bitstream as parameter information and delivered to the decoder.

The predictive tree generator may receive an input of whether to apply the quick predictive tree generation method based on the sorting order according to the setting of the transmission device. In the quick generation, a predictive tree may be generated according to the sorting order within a group, and a parent-child relationship may be established by finding a point that is close to the first point of a consecutive group among the groups. The indication of whether the quick predictive tree generation is applied may be included in the bitstream as parameter information and delivered to the decoder.

The geometry information encoder may check the geometry coding type. The geometry coding type may be set by the point cloud data transmission device according to the embodiments. For example, an optimal coding type may be determined based on point cloud data. Coding types according to embodiments may include octree-based coding, prediction-based coding, and/or trisoup-based coding.

In octree-based coding, an octree for the geometry data may be generated, and the geometry data may be encoded based on the octree.

In trisoup-based coding, a trisoup for the geometry data may be generated, and the geometry data may be encoded based on the trisoup.

In prediction-based coding, a predictive tree according to embodiments may be generated, and prediction data may be determined based on RDO.

For the prediction-based coding according to the embodiments, predictive tree construction type information, a point sorting method, maximum distance information, and the like may be input. Also, in the predictive tree, information on the applied predictive tree construction type and information on the applied point sorting method may be transmitted to the receiving decoder device.

The geometry information encoder may reconstruct geometry data, that is, position data. The reconstructed (restored) geometry data may be transmitted to the attribute information encoder for attribute coding.

When the geometry coding type is prediction-based coding, the geometry information encoder may generate a predictive tree through the predictive tree generator, and perform rate distortion optimization (RDO) based on the predictive tree generated through the RDO-based prediction determiner to select an optical prediction mode. Thus, a predicted value of geometry according to the optimal prediction mode may be generated.

The geometry information entropy encoder 16005 may encode point cloud data based on an entropy scheme. The geometry information encoder may generate an encoded geometry information bitstream.

The geometry information entropy encoder 16005 may construct a geometry information bitstream by entropy-coding a residual between the geometry data and the predicted value.

The attribute information encoder 1606 may receive attribute data from the data input unit and encode the same. Since the attribute data (or attribute) is dependent on the geometry data (or position), the attribute data may be encoded based on the geometry data reconstructed by the geometry position reconstructor. The data may be transformed for encoding of a color, which is attribute information. The attribute information encoder may encode the attribute data based on the entropy scheme.

The geometry information encoder may generate a geometry information bitstream by encoding the geometry data based on an octree, a predictive tree, a trisoup, or the like, and the attribute information encoder may encode the attribute data to generate the attribute information bitstream.

In addition, the encoder, which includes the geometry information encoder and the attribute information encoder, may include information about the geometry coding and attribute coding in the bitstream as parameter information and deliver the bitstream to the decoder.

Figure 17:
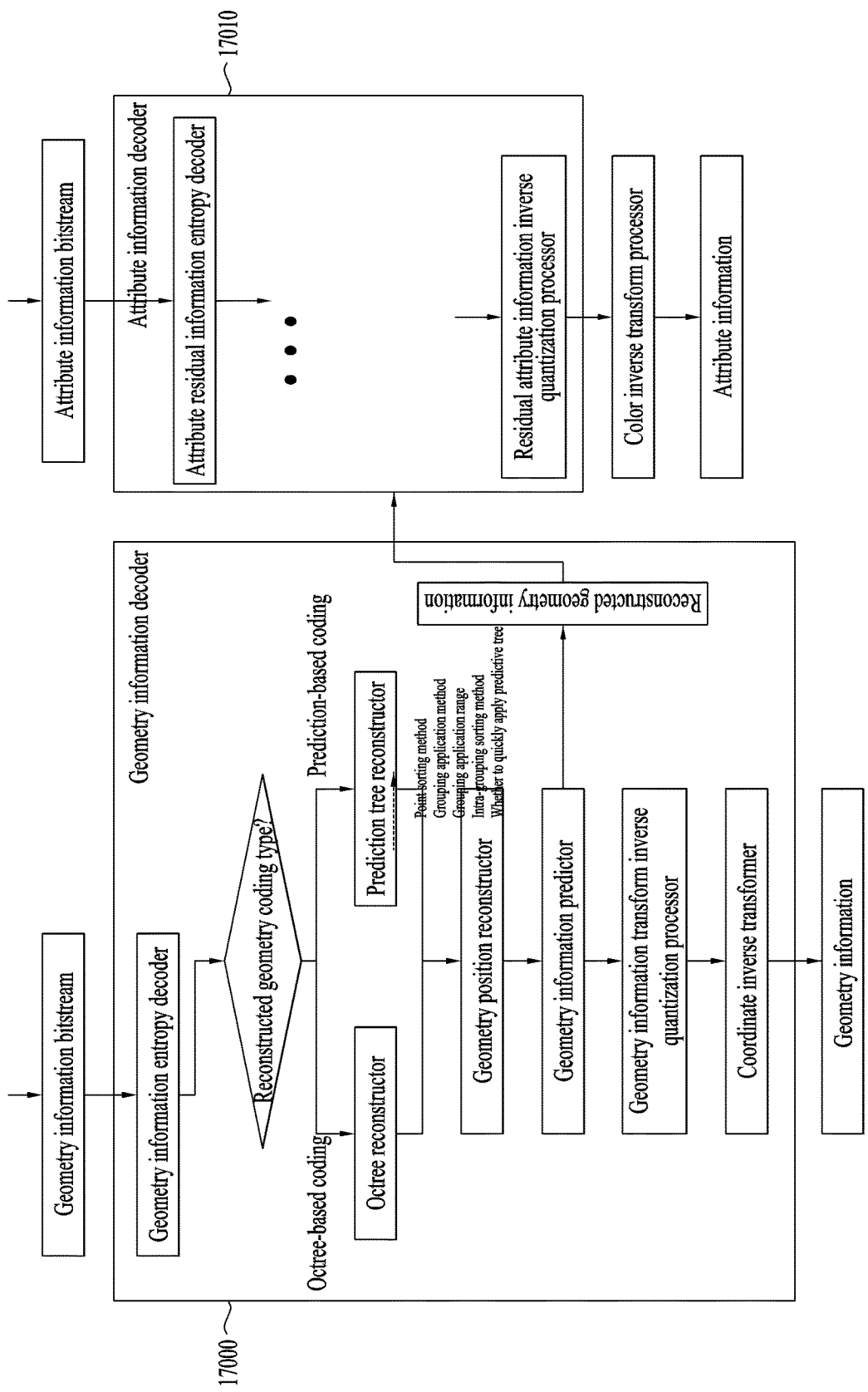
FIG. 17 illustrates a point cloud data reception device according to embodiments.

FIG. 17 illustrates a point cloud data reception device according to embodiments.

The reception device 10004 of FIG. 1, the point cloud video decoder 10006 of FIG. 1, the decoding of FIG. 2, the decoder of FIGS. 10 and 11, the reception device of FIG. 13, the device of FIG. 14, the point cloud data reception device of FIG. 17, or the like may decode point cloud data based on the method illustrated in FIG. 15. Each element may correspond to the point cloud data reception device that may be implemented by hardware including one or more processors or integrated circuits configured to communicate with one or more memories, software, firmware, or a combination thereof according to the embodiments.

The point cloud data reception device according to the embodiments may receive a bitstream including geometry data and attribute data, decode the geometry data, and decode the attribute data.

The operation of FIG. 17 may follow the reverse procedure of the corresponding operation of FIG. 16.

A geometry information decoder 17000 may receive a geometry information bitstream.

The geometry information decoder may decode the geometry data according to an entropy scheme by a geometry information entropy decoder.

The geometry information decoder may check the geometry coding type. The encoder may check whether octree-based coding or prediction-based coding is applied and perform corresponding decoding.

When octree-based coding is applied by the encoder, the geometry information decoder may perform octree-based decoding through an octree reconstructor.

When prediction-based coding is applied by the encoder, the geometry information decoder may perform predictive tree-based decoding through a predictive tree reconstructor.

The predictive tree reconstructor may check a point sorting method, application of grouping, a grouping application method, a grouping application range, and quick predictive tree application based on the parameter information included in the bitstream, reconstruct the predictive tree according to the checking, and decode the predicted value of geometry.

The geometry information decoder may reconstruct the geometry data (or position), generate the reconstructed geometry data, and deliver the reconstructed geometry data to the attribute information decoder.

The geometry information decoder may predict the geometry data through a geometry information predictor, transform the predicted data through a geometry information transform inverse quantization processor, and inversely quantize the transformed data.

The geometry information decoder may inversely transform the coordinates of the geometry data.

The geometry information decoder may decode the geometry information bitstream and reconstruct the geometry information.

The attribute information decoder 17010 may decode the attribute information bitstream and reconstruct the attribute information. The attribute information decoder may decode the attribute information based on the reconstructed geometry information.

The attribute information decoder may decode the residual of the attribute data delivered from the encoder through an attribute residual information entropy decoder based on the entropy scheme.

The attribution information decoder may inversely quantize the residual attribution information through a residual attribution information inverse quantization processor.

An inverse color transform processor may inversely transform attribute data (or color) and reconstruct the attribute information.

Figure 18:
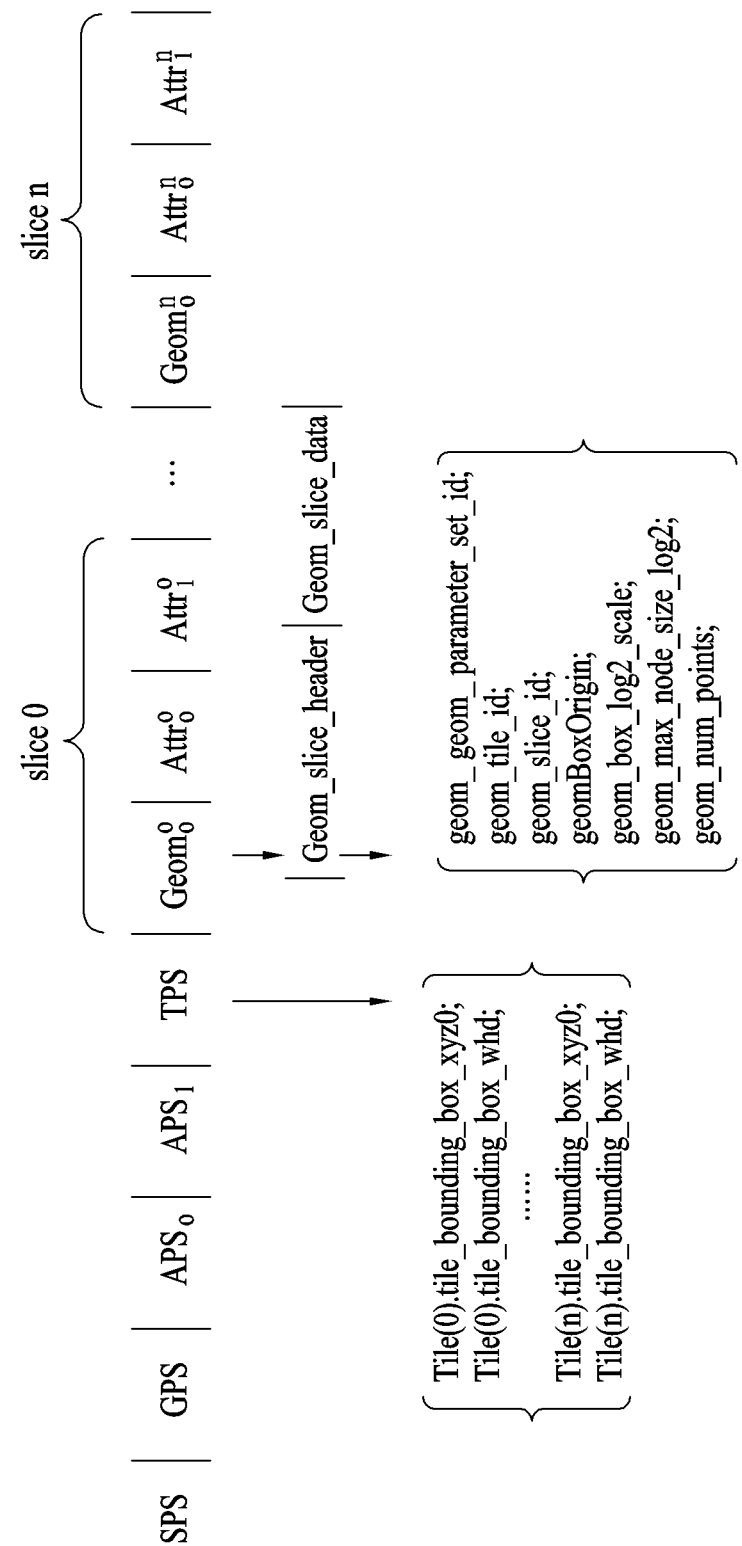
FIG. 18 shows a structure of a bitstream including point cloud data according to embodiments.

FIG. 18 shows a structure of a bitstream including point cloud data according to embodiments.

The transmission device 10000 of FIG. 1, the point cloud video encoder 10002 of FIG. 1, the encoding of FIG. 2, the encoder of FIG. 4, the transmission device of FIG. 12, the device of FIG. 14, the point cloud data transmission device of FIG. 16, or the like may generate a bitstream including the point cloud data configured as shown in FIG. 18. The reception device 10004 of FIG. 1, the point cloud video decoder 10006 of FIG. 1, the decoding of FIG. 2, the decoder of FIGS. 10 and 11, the reception device of FIG. 13, the device of FIG. 14, the point cloud data reception device of FIG. 17, or the like may decode a bitstream including point cloud data configured as shown in FIG. 18.

For example, the method/device according to the embodiments may signal PCC encoding related information. Signaling information according to the embodiments may be used at a transmitting side or a receiving side. The signaling information according to the embodiments may be generated and transmitted by the transmission/reception device according to the embodiments, for example, a metadata processor (which may be referred to as a metadata generator or the like) of the transmission device and may be received and obtained by a metadata parser of the reception device. Each operation of the reception device according to the embodiments may be performed based on the signaling information. The coded point cloud configuration is described below.

Abbreviations referring to information included in the point cloud data are: SPS (Sequence Parameter Set); GPS (Geometry Parameter Set); APS (Attribute Parameter Set); TPS (Tile Parameter Set); Geom (Geometry bitstream), wherein the geometry bitstream may include a geometry slice header and/or geometry slice data; and Attr (Attribute bitstream), wherein the attribute bitstream may include an attribute brick header and attribute brick data. According to embodiments, a slice may represent a unit of encoding. Slice-based geometry may be encoded in geometry encoding, and a slice-based attribute may be encoded in attribute encoding. According to embodiments, a data unit may be added to the bitstream structure. Geometry/attribute data may be delivered on a per data unit basis.

The method/device according to the embodiments may add option information related to the point sorting/predictive tree generation related to the operations of FIGS. 15 to 17 to the SPS or the GPS in the bitstream of the point cloud data that is to be delivered, as shown in FIGS. 19 and 20.

The method/device according to the embodiments may add option information related to the point sorting/predictive tree generation related to the operations of FIGS. 15 to 17 to the TPS or the geometry header for each slice that is to be delivered, as shown in FIGS. 21 and 22.

The method/device according to the embodiments may process the point cloud data on a tile or slice basis such that the point cloud may be divided into regions to be processed.

When the point cloud data is divided into regions, an option for generating different sets of neighbor points for the respective regions may be set to provide various options such as an option of low complexity and low reliability of results or an option of high complexity and high reliability. The option may be set differently according to the processing capacity of the receiver.

Accordingly, when the point cloud is divided into tiles, different options may be applied to the respective tiles. Setting information for each tile may be carried in TPS information.

When the point cloud is divided into slices, different options may be applied to the respective slices. Setting information for each slice may be carried in slice header information.

FIG. 19 shows a sequence parameter set according to embodiments.

The transmission device 10000 of FIG. 1, the point cloud video encoder 10002 of FIG. 1, the encoding of FIG. 2, the encoder of FIG. 4, the transmission device of FIG. 12, the device of FIG. 14, the point cloud data transmission device of FIG. 16, or the like are shown in FIG. 19 may generate a bitstream including point cloud data and sequence parameter information related to the point cloud data configured as shown in FIG. 19. The reception device 10004 of FIG. 1, the point cloud video decoder 10006 of FIG. 1, the decoding of FIG. 2, the decoder of FIGS. 10 and 11, the reception device of FIG. 13, the device of FIG. 14, the point cloud data reception device of FIG. 17, or the like may decode the bitstream including the point cloud data and the sequence parameter information related to the point cloud data configured as shown in FIG. 19.

Optional information related to point sorting and predictive tree generation according to the embodiments may be included in the sequence parameter set.

pred_geom_tree_sorting_num_steps: may indicate a point sorting step to be applied in a corresponding sequence. A point sorting method for a predictive geometry tree may be applied in a plurality of steps in a corresponding sequence. The sequence may represent a frame including point cloud data.

pred_geom_tree_sorting_type: may indicate a stepwise sorting method to be applied in generating a predictive geometry tree from a corresponding sequence:
  0=No sorting;
  1=Sorting in Morton code order;
  2=Sorting in radius order;
  3=Sorting in azimuth order;
  4=Sorting in elevation order;
  5=Sorting in sensor ID order;
  6=Sorting in captured time order.

A value according to each sorting method may be changed to other values.

pred_geom_tree_sorting_ascending_flag: When points are sorted according to each step in generating a predictive geometry tree in the corresponding sequence, this flag indicates information on whether to sort the points in ascending order (true) or descending order (false) for the respective steps.

pred_geom_tree_group_sorting_flag: indicates information on whether to perform grouping-based sorting for each sorting step in generating a predictive geometry tree for the corresponding sequence.

pred_geom_tree_grouping_n_digit: indicates a range in which grouping is applied when performing stepwise sorting grouping in generating a predictive geometry tree in the corresponding sequence. Although the syntax of the grouping application range is the same, the grouping range application may vary according to pred_geom_tree_sorting_type.

For example, a Morton code grouping range may be expressed as a shift value.

When data such as radius, azimuth, or elevation has a decimal point, the grouping range may be expressed as a digit number to be rounded off. Alternatively, the grouping range may be expressed as a value indicating the range.

pred_geom_tree_build_method: may indicate a method for generating a predictive geometry tree in a corresponding sequence:
  0=Sorting order-based predictive tree generation;
  1=KD tree-based predictive tree generation based on distance;
  3=Predictive tree generation based on order of sorting into groups.

Each integer value may be set differently.

profile_idc: may indicate profile information about a bitstream according to embodiments. Available candidate values may be reserved by ISO/IEC.

profile_compatibility_flags: When equal to 1, this indicates that the bitstream conforms to a profile indicated by profile_idc.

sps_num_attribute_sets: indicates the number of coded attributes in the bitstream. It may have values ranging from 0 to 63.

attribute_dimension[i]: indicates the number of components of the i-th attribute. The attribute components may include color and reflectance.

attribute_instance_id[i]: indicates the instance ID of the i-th attribute.

The method/device according to the embodiments may deliver signaling information based on the prediction geometry coding related parameters according to FIGS. 19 to 22 as follows.

For example, the sorting method (sorting in a Morton code order, sorting in a radius order, sorting in an azimuth order, sorting in an elevation order, sorting in a sensor ID order, or sorting in a captured time order) applied to the points may be indicated by the pred_geom_tree_sorting_type information of FIGS. 19 to 22.

A grouping sorting method (sorting in a Morton code order, sorting in a radius order, sorting in an azimuth order, sorting in an elevation order, sorting in a sensor ID order, or sorting in a captured time order) applied to grouping may be indicated by pred_geom_tree_sorting_type information of FIGS. 19 to 22.

The grouping range (a shift value may be received for the Morton code grouping method, and a digit to be rounded off may be received for data having a decimal point such as an azimuth, the number of rounding digits can be input, and a range for other data) may be indicated by the pred_geom_tree_grouping_n_digit information of FIGS. 19 to 22.

The intra-group sorting method (sorting in a Morton code order, sorting in a radius order, sorting in an azimuth order, sorting in an elevation order, sorting in a sensor ID order, sorting in a captured time order, or a combination thereof) may be indicated by the pred_geom_tree_sorting_type information of FIGS. 19 to 22.

Whether to apply a grouping-based quick predictive tree generation method may be indicated by pred_geom_tree_group_sorting_flag information of FIGS. 19 to 22.

The sorting method applied to a point, the grouping sorting method applied to grouping, the intra-group sorting method, and the like may be distinguished by the pred_geom_tree_sorting_num_steps information. When there are one or more pred_geom_tree_sorting_num_steps, there may be one sorting step and two sorting steps (sorting_type[0], sorting_type[1]). Where there is a plurality of sorting types, the types may be applied first in a large range and then in a grouped range.

For example, in FIGS. 19 to 22, when there is a plurality of steps, if i=0 in "for (i=0; i<pred_geom_tree_sorting_num_steps; i++)," pred_geom_tree_sorting_type may indicate a sorting method applied to the points. If i=1, pred_geom_tree_sorting_type may indicate a grouping sorting method applied to grouping. If i=2, pred_geom_tree_sorting_type may indicate an intra-group sorting method. The order of pieces of information indicated according to i may vary according to embodiments.

FIG. 20 shows a geometry parameter set according to embodiments.

The transmission device 10000 of FIG. 1, the point cloud video encoder 10002 of FIG. 1, the encoding of FIG. 2, the encoder of FIG. 4, the transmission device of FIG. 12, the device of FIG. 14, or the point cloud data transmission device of FIG. 16 may generate a bitstream including point cloud data and geometry parameter information related to the point cloud data configured as shown in FIG. 20. The reception device 10004 of FIG. 1, the point cloud video decoder 10006 of FIG. 1, the decoding of FIG. 2, the decoder of FIGS. 10 and 11, the reception device of FIG. 13, the device of FIG. 14, or the point cloud data reception device of FIG. 17 may decode the bitstream including the point cloud data and the geometry parameter information related to the point cloud data configured as shown in FIG. 20.

The method/device according to the embodiments may add related option information for a point sorting/predictive tree generation function to a geometry parameter set so as to be delivered.

pred_geom_tree_sorting_num_steps: may indicate a point sorting step to be applied in a corresponding sequence. A point sorting method for a predictive geometry tree may be applied in a plurality of steps in a corresponding sequence. The sequence may represent a frame including point cloud data.

pred_geom_tree_sorting_type: may indicate a stepwise sorting method to be applied in generating a predictive geometry tree from a corresponding sequence:
0=No sorting;
1=Sorting in Morton code order;
2=Sorting in radius order;
3=Sorting in azimuth order;
4=Sorting in elevation order;
5=Sorting in sensor ID order;
6=Sorting in captured time order.

A value according to each sorting method may be changed to other values.

pred_geom_tree_sorting_ascending_flag: When points are sorted according to each step in generating a predictive geometry tree in the corresponding sequence, this flag indicates information on whether to sort the points in ascending order (true) or descending order (false) for the respective steps.

pred_geom_tree_group_sorting_flag: indicates information on whether to perform grouping-based sorting for each sorting step in generating a predictive geometry tree for the corresponding sequence.

pred_geom_tree_grouping_n_digit: indicates a range in which grouping is applied when performing stepwise sorting grouping in generating a predictive geometry tree in the corresponding sequence. Although the syntax of the grouping application range is the same, the grouping range application may vary according to pred_geom_tree_sorting_type.

For example, a Morton code grouping range may be expressed as a shift value.

When data such as radius, azimuth, or elevation has a decimal point, the grouping range may be expressed as a digit number to be rounded off. Alternatively, the grouping range may be expressed as a value indicating the range.

pred_geom_tree_build_method: may indicate a method for generating a predictive geometry tree in a corresponding sequence:
0=Sorting order-based predictive tree generation;
1=KD tree-based predictive tree generation based on distance;
3=Predictive tree generation based on order of sorting into groups.

Each integer value may be set differently.

gps_geomparameter_set_id: indicates an identifier for the GPS for reference by other syntax elements. The value of gps_geomparameter_set_id may be in the range of 0 to 15, inclusive.

gps_seq_parameter_set_id: may indicate a value of sps_seqparameter_set_id for the active SPS. The value of gps_seqparameter_set_id shall be in the range of 0 to 15, inclusive.

FIG. 21 shows a tile parameter set according to embodiments.

The transmission device 10000 of FIG. 1, the point cloud video encoder 10002 of FIG. 1, the encoding of FIG. 2, the encoder of FIG. 4, the transmission device of FIG. 12, the device of FIG. 14, the point cloud data transmission device of FIG. 16, or the like may generate a bitstream including point cloud data and tile parameter information related to the point cloud data configured as shown in FIG. 21. The reception device 10004 of FIG. 1, the point cloud video decoder 10006 of FIG. 1, the decoding of FIG. 2, the decoder of FIGS. 10 and 11, the reception device of FIG. 13, the device of FIG. 14, the point cloud data reception device of FIG. 17, or the like may decode the bitstream including the point cloud data and the tile parameter information related to the point cloud data configured as shown in FIG. 21.

The method/device according to the embodiments may add related option information for a point sorting/predictive tree generation function to a tile parameter set so as to be delivered.

pred_geom_tree_sorting_num_steps: may indicate a point sorting step to be applied in a corresponding tile. A point sorting method for a predictive geometry tree may be applied in a plurality of steps in a corresponding tile. The tile may represent a frame unit for processing point cloud data.

pred_geom_tree_sorting_type: may indicate a stepwise sorting method to be applied in generating a predictive geometry tree from a corresponding tile:
- 0=No sorting;
- 1=Sorting in Morton code order;
- 2=Sorting in radius order;
- 3=Sorting in azimuth order;
- 4=Sorting in elevation order;
- 5=Sorting in sensor ID order;
- 6=Sorting in captured time order.

A value according to each sorting method may be changed to other values.

pred_geom_tree_sorting_ascending_flag: When points are sorted according to each step in generating a predictive geometry tree in the corresponding tile, this flag indicates information on whether to sort the points in ascending order (true) or descending order (false) for the respective steps.

pred_geom_tree_group_sorting_flag: indicates information on whether to perform grouping-based sorting for each sorting step in generating a predictive geometry tree for the corresponding tile.

pred_geom_tree_grouping_n_digit: indicates a range in which grouping is applied when performing stepwise sorting grouping in generating a predictive geometry tree in the corresponding tile. Although the syntax of the grouping application range is the same, the grouping range application may vary according to pred_geom_tree_sorting_type.

For example, a Morton code grouping range may be expressed as a shift value.

When data such as radius, azimuth, or elevation has a decimal point, the grouping range may be expressed as a digit number to be rounded off. Alternatively, the grouping range may be expressed as a value indicating the range.

pred_geom_tree_build_method: may indicate a method for generating a predictive geometry tree in a corresponding tile:
- 0=Sorting order-based predictive tree generation;
- 1=KD tree-based predictive tree generation based on distance;
- 3=Predictive tree generation based on order of sorting into groups.

Each integer value may be set differently.

gps_geom_parameter_set_id: indicates an identifier for the GPS for reference by other syntax elements. The value of gps_geom_parameter_set_id may be in the range of 0 to 15, inclusive.

gps_seq_parameter_set_id: may indicate a value of sps_seq_parameter_set_id for the active SPS. The value of gps_seq_parameter_set_id shall be in the range of 0 to 15, inclusive.

num_tiles: indicates the number of tiles signaled for the bitstream. When not present, num_tiles may be inferred to be 0.

tile_bounding_box_offset_x[i]: indicates the x offset of the i-th tile in the Cartesian coordinates. When not present, it may be inferred to be the x offset of tile_bounding_box_offset_x[0].

tile_bounding_box_offset_y[i]: indicates the y offset of the i-th tile in the Cartesian coordinates. When not present, it may be inferred to be the y offset of tile_bounding_box_offset_y[0].

tile_bounding_box_offset_z[i]): indicates the z offset of the i-th tile in the Cartesian coordinates. When not present, it may be inferred to be the z offset of the tile_bounding_box_offset_z[0].

FIG. 22 shows a geometry slice header according to embodiments.

The transmission device 10000 of FIG. 1, the point cloud video encoder 10002 of FIG. 1, the encoding of FIG. 2, the encoder of FIG. 4, the transmission device of FIG. 12, the device of FIG. 14, the point cloud data transmission device of FIG. 16, or the like may generate a bitstream including point cloud data and slice header information related to the point cloud data configured as shown in FIG. 22. The reception device 10004 of FIG. 1, the point cloud video decoder 10006 of FIG. 1, the decoding of FIG. 2, the decoder of FIGS. 10 and 11, the reception device of FIG. 13, the device of FIG. 14, the point cloud data reception device of FIG. 17, or the like may decode the bitstream including the point cloud data and the slice header information related to the point cloud data configured as shown in FIG. 22.

The method/device according to the embodiments may add related option information for a point sorting/predictive tree generation function to a geometry slice header so as to be delivered. A slice may be a unit of encoding and decoding of the point cloud data.

pred_geom_tree_sorting_num_steps: may indicate a point sorting step to be applied in a corresponding slice. A point sorting method for a predictive geometry tree may be applied in a plurality of steps in a corresponding slice.

pred_geom_tree_sorting_type: may indicate a stepwise sorting method to be applied in generating a predictive geometry tree from a corresponding slice:
- 0=No sorting;
- 1=Sorting in Morton code order;
- 2=Sorting in radius order;
- 3=Sorting in azimuth order;
- 4=Sorting in elevation order;
- 5=Sorting in sensor ID order;
- 6=Sorting in captured time order.

A value according to each sorting method may be changed to other values.

pred_geom_tree_sorting_ascending_flag: When points are sorted according to each step in generating a predictive geometry tree in the corresponding slice, this flag indicates information on whether to sort the points in ascending order (true) or descending order (false) for the respective steps.

pred_geom_tree_group_sorting_flag: indicates information on whether to perform grouping-based sorting for each sorting step in generating a predictive geometry tree for the corresponding slice.

pred_geom_tree_grouping_n_digit: indicates a range in which grouping is applied when performing stepwise sorting grouping in generating a predictive geometry tree in the corresponding slice. Although the syntax of the grouping application range is the same, the grouping range application may vary according to pred_geom_tree_sorting_type.

For example, a Morton code grouping range may be expressed as a shift value.

When data such as radius, azimuth, or elevation has a decimal point, the grouping range may be expressed as a digit number to be rounded off. Alternatively, the grouping range may be expressed as a value indicating the range.

pred_geom_tree_build_method: may indicate a method for generating a predictive geometry tree in a corresponding slice:
  0=Sorting order-based predictive tree generation;
  1=KD tree-based predictive tree generation based on distance;
  3=Predictive tree generation based on order of sorting into groups.

Each integer value may be set differently.

gsh_geometry_parameter_set_id: indicates the value of gps_geom_parameter_set_id of the active GPS.

gsh_tile_id: indicates the value of the tile ID referenced by the GSH. The value of gsh_tile_id may be in the range of 0 to XX, inclusive.

gsh_slice_id: ID identifying the slice header for reference by other syntax elements. The value of gsh_slice_id may be in the range of 0 to XX, inclusive.

FIG. 23 illustrates a method of transmitting point cloud data according to embodiments.

2300: The point cloud data transmission method according to the embodiments may include encoding point cloud data. According to embodiments, the encoding operation may include: the point cloud video acquisition 10001 of FIG. 1, the point cloud video encoder 10002 of FIG. 1, the acquisition 20000 of FIG. 2, the encoding 20001 of FIG. 2, the operations of the point cloud data encoder of FIG. 4, the operations of the point cloud data transmission device of FIG. 12, processing of each device of FIG. 14, the point cloud data encoding method of FIG. 15, the operations of the point cloud data transmission device of FIG. 16, and bitstream generation for the point cloud data of FIGS. 18 to 22.

2301: The point cloud data transmission method according to the embodiments may further include transmitting a bitstream including the point cloud data. According to the embodiments, the transmission operation include the operation of the transmitter 10003 of FIG. 1, the transmission 20002 of FIG. 2, the transmission of the geometry bitstream and the attribute bitstream of FIG. 4, the transmission 12012 of the encoded point cloud data of FIG. 12, the data transmission from each device of FIG. 14, the transmission of the geometry information bitstream and/or attribute information bitstream of FIG. 16, and the bitstream transmission for f the point cloud data of FIGS. 18 to 22.

Figure 24:
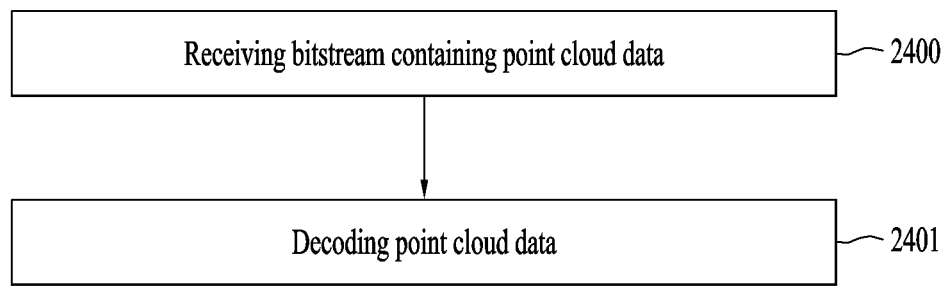
FIG. 24 illustrates a method of receiving point cloud data according to embodiments.

FIG. 24 illustrates a method of receiving point cloud data according to embodiments.

2400: The point cloud data reception method according to the embodiments may include receiving a bitstream including point cloud data. According to embodiments, the reception operation may include the operation of the receiver 10005 of FIG. 1, reception according to the transmission 20002 of FIG. 2, the reception of a bitstream including the geometry bitstream and the attribute bitstream of FIGS. 10 and 11, the operation of the receiver 13000 of FIG. 13, the data reception by each device of FIG. 14, the reception of the geometry information bitstream and the attribute information bitstream of FIG. 17, and the reception of the bitstream of FIGS. 18 to 22.

2401: The point cloud data reception method according to the embodiments may further include decoding the point cloud data. According to embodiments, the decoding operation may include the operation of the point cloud video decoder 10006 of FIG. 1, the decoding 20003 of FIG. 2, the decoding of the point cloud data of FIGS. 10 and 11, the operation of the point cloud data reception device of FIG. 13, data processing by each device of FIG. 14, the point sorting and predictive tree generation of FIG. 15, the operation of the point cloud data reception device of FIG. 17, and the decoding of the geometry data and/or attribute data included in the bitstream based on the parameter information included in the bitstream of FIGS. 18 to 22.

A method of transmitting point cloud data according to embodiments may include encoding point cloud data; and transmitting a bitstream including the point cloud data.

In the encoding of the point cloud data according to the embodiments, for example, the geometry encoding may include predictive geometry encoding of geometry data based on a predictive tree.

According to embodiments, points of the geometry data may be sorted based on a sorting type, and the sorting type may include at least one of a Morton order, an azimuth angle order, or a radial distance order. The points may be sorted by rounding at least one of an azimuth, a radius, or an elevation.

The encoding of the geometry data according to the embodiments may include generating the predictive tree based on the sorted points of the geometry data.

The encoding of the geometry data according to the embodiments may include generating prediction data for the geometry data based on the predictive tree.

The encoding of the geometry data according to the embodiments may include generating a residual of the geometry data based on the prediction data.

According to embodiments, the bitstream may include parameter information for predictive geometry coding.

An apparatus for receiving point cloud data according to embodiments may include a receiver configured to receive a bitstream including point cloud data, and a decoder configured to decode the point cloud data.

According to embodiments, the decoder configured to decode the point cloud data, for example, a geometry decoder may perform predictive geometry decoding on the geometry data based on a predictive tree.

According to embodiments, the bitstream may include parameter information for the predictive geometry coding. Points of the geometry data may be sorted based on a sorting type, wherein the sorting type may include at least one of a Morton order, an azimuth angle order, or a radial distance order. The points may be sorting by rounding at least one of an azimuth, a radius, or an elevation.

The method/device according to the embodiments may provide the following effects.

In a scenario in which a low-latency service is required, for example, in case that point cloud data should be captured and transmitted from LiDAR in real time, or a service of receiving and processing 3D map data in real time is to be provided, the time required for encoding and decoding may need to be shortened. As a method to shorten the time, even when the point cloud information is not fully given, encoding may be started with partial point cloud information, and streaming and decoding may be performed. Thereby, latency may be reduced.

In order to reduce the latency of the geometry information compression technique of Geometry-based Point Cloud Compression (G-PCC) for 3D point cloud data compression for a low-latency service while maintaining the bitstream size of the content, embodiments provides a grouping-based sorting method for sorting points according to the distribution characteristics. The sorting order may affect the bitstream size by closely affecting the predictive tree generation, particularly, the setting of parent and child nodes. In addition, a method for quickly generating a predictive tree is provided.

The embodiments provide a sorting method according to the characteristics of content for an efficient predictive tree generation method for the G-PCC encoder/decoder for 3D point cloud data compression. Accordingly, geometry compression coding/decoding efficiency may be enhanced.

Therefore, the transmission method/device according to the embodiments may efficiently compress the point cloud data transmit data transmit the compressed data, and also deliver signaling information for the data. Accordingly, the reception method/device according to the embodiments may also efficiently decode/reconstruct the point cloud data.

Embodiments have been described from the method and/or device perspective, and descriptions of methods and devices may be applied so as to complement each other.

Although the accompanying drawings have been described separately for simplicity, it is possible to design new embodiments by merging the embodiments illustrated in the respective drawings. Designing a recording medium readable by a computer on which programs for executing the above-described embodiments are recorded as needed by those skilled in the art also falls within the scope of the appended claims and their equivalents. The devices and methods according to embodiments may not be limited by the configurations and methods of the embodiments described above. Various modifications can be made to the embodiments by selectively combining all or some of the embodiments. Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the devices of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the device according to the embodiments may include one or more processors capable of executing one or more programs. The one or more programs may perform any one or more of the operations/methods according to the embodiments or include instructions for performing the same. Executable instructions for performing the method/operations of the device according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this specification, the term "/" and "," should be interpreted as indicating "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C." Further, in this specification, the term "or" should be interpreted as indicating "and/or." For instance, the expression "A or B" may mean 1) only A, 2) only B, or 3) both A and B. In other words, the term "or" used in this document should be interpreted as indicating "additionally or alternatively."

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signals unless context clearly dictates otherwise.

The terms used to describe the embodiments are used for the purpose of describing specific embodiments, and are not intended to limit the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to be interpreted, when a specific condition is satisfied, to perform the related operation or interpret the related definition according to the specific condition.

Operations according to the embodiments described in this specification may be performed by a transmission/reception device including a memory and/or a processor according to embodiments. The memory may store programs for processing/controlling the operations according to the embodiments, and the processor may control various operations described in this specification. The processor may be referred to as a controller or the like. In embodiments, operations may be performed by firmware, software, and/or a combination thereof. The firmware, software, and/or a combination thereof may be stored in the processor or the memory.

The operations according to the above-described embodiments may be performed by the transmission device and/or the reception device according to the embodiments. The transmission/reception device includes a transmitter/receiver configured to transmit and receive media data, a memory configured to store instructions (program code, algorithms, flowcharts and/or data) for a process according to embodiments, and a processor configured to control operations of the transmission/reception device.

The processor may be referred to as a controller or the like, and may correspond to, for example, hardware, software, and/or a combination thereof. The operations according to the above-described embodiments may be performed by the processor. In addition, the processor may be implemented as an encoder/decoder for the operations of the above-described embodiments.

As described above, related contents have been described in the best mode for carrying out the embodiments.

As described above, the embodiments may be fully or partially applied to the point cloud data transmission/reception device and system.

It will be apparent to those skilled in the art that various changes or modifications can be made to the embodiments within the scope of the embodiments.

Thus, it is intended that the embodiments cover the modifications and variations of this disclosure provided they come within the scope of the appended claims and their equivalents.

What is claimed is:

1. A method for transmitting point cloud data, the method comprising:
   encoding geometry data of point cloud data, wherein the encoding the geometry data includes:
   predictive geometry encoding the geometry data based on a predictive tree,
   wherein points of the geometry data are sorted based on a sorting type,
   wherein the sorting type includes at least one of an azimuth angle order or a radial distance order, and
   wherein the points are sorted by rounding the at least one of an azimuth or a radius;
   encoding attribute data of point cloud data; and
   transmitting a bitstream including the geometry data and the attribute data of the point cloud data.

2. The method of claim 1, wherein the encoding the geometry data further includes:
   generating the predictive tree based on the sorted points of the geometry data.

3. The method of claim 1, wherein the encoding the geometry data further includes:
   generating prediction data for the geometry data based on the predictive tree.

4. The method of claim 3, wherein the encoding the geometry data further includes:
   generating a residual for the geometry data based on the prediction data.

5. The method of claim 4, wherein the encoding the geometry data further includes:
   reconstructing the geometry data,
   wherein the encoding the attribute data is performed based on the reconstructed geometry data.

6. The method of claim 1, wherein the bitstream includes parameter information for predictive geometry encoding.

7. An apparatus for transmitting point cloud data, the apparatus comprising:
   a geometry encoder configured to encode geometry data of point cloud data, wherein the encoder performs:
   predictive geometry encoding the geometry data based on a predictive tree,
   wherein points of the geometry data are sorted based on a sorting type,
   wherein the sorting type includes at least one of an azimuth angle order or a radial distance order, and
   wherein the points are sorted by rounding the at least one of an azimuth or a radius;
   an attribute encoder configured to encode attribute data of point cloud data; and
   a transmitter configured to transmit a bitstream including the geometry data and the attribute data of the point cloud data.

8. The apparatus of claim 7, wherein the geometry encoder further performs:
   generating the predictive tree based on the sorted points of the geometry data.

9. The apparatus of claim 7, wherein the geometry encoder further performs:
   generating prediction data for the geometry data based on the predictive tree.

10. The apparatus of claim 9, wherein the geometry encoder further performs:
    generating a residual for the geometry data based on the prediction data.

11. The apparatus of claim 10, wherein the geometry encoder further performs:
    reconstructing the geometry data,
    wherein the attribute encoder encodes the attribute data based on the reconstructed geometry data.

12. The apparatus of claim 7, wherein the bitstream includes parameter information for predictive geometry encoding.

13. A method for receiving point cloud data, comprising:
    receiving a bitstream including point cloud data;
    decoding geometry data of the point cloud data, wherein the decoding the geometry data includes:
    predictive geometry decoding the geometry data based on a predictive tree,
    wherein points of the geometry data are sorted based on a sorting type,
    wherein the sorting type includes at least one of an azimuth angle order or a radial distance order, and
    wherein the points are sorted by rounding the at least one of an azimuth or a radius; and
    decoding attribute data of the point cloud data.

14. The method of claim 13, wherein the bitstream includes parameter information for predictive geometry encoding.

15. An apparatus for receiving point cloud data, comprising:
    a receiver configured to receive a bitstream including point cloud data;
    a geometry decoder configured to decode geometry data of the point cloud data, wherein the geometry decoder performs:
    predictive geometry decoding the geometry data based on a predictive tree,
    wherein points of the geometry data are sorted based on a sorting type,
    wherein the sorting type includes at least one of an azimuth angle order or a radial distance order, and
    wherein the points are sorted by rounding the at least one of an azimuth or a radius; and
    an attribute decoder configured to decode attribute data of the point cloud data.

16. The apparatus of claim 15, wherein the bitstream includes parameter information for predictive geometry encoding.

* * * * *